(12) United States Patent
Fukui et al.

(10) Patent No.: US 9,648,104 B2
(45) Date of Patent: May 9, 2017

(54) CONFIGURATION INFORMATION ACQUISITION METHOD AND MANAGEMENT COMPUTER

(71) Applicant: Hitachi, Ltd., Tokyo (JP)

(72) Inventors: Yoshiki Fukui, Tokyo (JP); Takuya Okamoto, Tokyo (JP); Takato Kusama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 151 days.

(21) Appl. No.: 14/427,610

(22) PCT Filed: Mar. 1, 2013

(86) PCT No.: PCT/JP2013/055670
§ 371 (c)(1),
(2) Date: Mar. 11, 2015

(87) PCT Pub. No.: WO2014/132440
PCT Pub. Date: Sep. 4, 2014

(65) Prior Publication Data
US 2015/0373111 A1    Dec. 24, 2015

(51) Int. Cl.
*G06F 15/167* (2006.01)
*H04L 29/08* (2006.01)
*G06F 3/06* (2006.01)
*G06F 9/50* (2006.01)
*H04L 12/24* (2006.01)

(52) U.S. Cl.
CPC ........ *H04L 67/1097* (2013.01); *G06F 3/0605* (2013.01); *G06F 3/067* (2013.01); *G06F 3/0629* (2013.01); *G06F 9/5077* (2013.01); *H04L 41/0853* (2013.01); *H04L 67/1012* (2013.01)

(58) Field of Classification Search
None
See application file for complete search history.

(56) References Cited

U.S. PATENT DOCUMENTS

| 2006/0218367 A1 | 9/2006 | Ukai et al. |
| 2008/0028049 A1 | 1/2008 | Taguchi et al. |
| 2008/0059697 A1 | 3/2008 | Sakaki et al. |

(Continued)

FOREIGN PATENT DOCUMENTS

| JP | 2006-268398 A | 10/2006 |
| JP | 2008-033412 A | 2/2008 |

(Continued)

*Primary Examiner* — Padma Mundur
(74) *Attorney, Agent, or Firm* — Volpe and Koenig, P.C.

(57) ABSTRACT

A management computer configured to manage one or more storage apparatuses managing a plurality of resources transmits requests to the one or more storage apparatuses to, based on one or more basic information pieces for identifying the one or more storage apparatuses, acquire as a priority configuration information on, out of the plurality of resources, resources logically closer to a host computer of the one or more storage apparatuses. The management computer receives the configuration information corresponding to the requests from the one or more storage apparatuses, and incorporates the received configuration information into configuration management information for managing the configuration information on the resources managed by the one or more storage apparatuses.

5 Claims, 17 Drawing Sheets

(56) References Cited

U.S. PATENT DOCUMENTS

| 2011/0078395 | A1 | | 3/2011 | Okada et al. | |
|---|---|---|---|---|---|
| 2012/0215895 | A1 | * | 8/2012 | Kono .................. | G06F 12/0653 |
| | | | | | 709/223 |
| 2013/0212134 | A1 | * | 8/2013 | S ........................ | H04L 67/1097 |
| | | | | | 707/827 |

FOREIGN PATENT DOCUMENTS

| JP | 2008-065561 A | 3/2008 |
|---|---|---|
| JP | 2011-076286 A1 | 4/2011 |
| JP | 2012-155544 A | 8/2012 |

\* cited by examiner

Fig. 8A

| Virtual storage identifier | Physical storage identifier |
|---|---|
| Virtual storage 1 | Physical storage 1 |
| Virtual storage 1 | Physical storage 2 |

| Virtual storage identifier | Virtual parity group identifier | Physical storage identifier | Physical parity group identifier |
|---|---|---|---|
| Virtual storage 1 | Virtual parity group 1 | Physical storage 1 | Physical parity group 1 |
| Virtual storage 1 | Virtual parity group 2 | Physical storage 2 | Physical parity group 1 |
| Virtual storage 1 | Virtual parity group 3 | Physical storage 2 | Physical parity group 2 |

| Virtual storage identifier | Virtual pool identifier | Physical storage identifier | Physical pool identifier |
|---|---|---|---|
| Virtual storage 1 | Virtual pool 1 | Physical storage 1 | Physical pool 1 |

| Virtual storage identifier | Virtual volume identifier | User identifier | Virtual pool identifier | Virtual parity group identifier | Volume characteristic | Usability | Physical storage identifier | Physical volume identifier |
|---|---|---|---|---|---|---|---|---|
| Virtual storage 1 | Virtual volume 1 | Virtual pool 1 | - | Virtual parity group 1 | Internal | Used | Physical storage 1 | Physical volume 1 |
| Virtual storage 1 | Virtual volume 2 | Virtual pool 1 | - | Virtual parity group 1 | Internal | Used | Physical storage 1 | Physical volume 2 |
| Virtual storage 1 | Virtual volume 3 | Host 1 | Virtual pool 1 | - | End | Used | Physical storage 1 | Physical volume 3 |
| Virtual storage 1 | Virtual volume 4 | Host 1 | Virtual pool 1 | - | End | Used | Physical storage 1 | Physical volume 4 |
| Virtual storage 1 | Virtual volume 5 | Host 2 | - | Virtual parity group 2 | End | Used | Physical storage 2 | Physical volume 1 |
| Virtual storage 1 | Virtual volume 6 | - | - | Virtual parity group 2 | End | Unused | Physical storage 2 | Physical volume 2 |
| Virtual storage 1 | Virtual volume 7 | - | - | Virtual parity group 3 | End | Unused | Physical storage 2 | Physical volume 3 |
| Virtual storage 1 | Virtual volume 8 | - | - | Virtual parity group 3 | End | Unused | Physical storage 2 | Physical volume 4 |

| Physical storage identifier | Physical parity group identifier | Capacity | Type |
|---|---|---|---|
| Physical storage 1 | Physical parity group 1 | 60GB | SSD |

Fig. 9B

| Physical storage identifier | Physical parity group identifier | Capacity | Type |
|---|---|---|---|
| Physical storage 2 | Physical parity group 1 | 60GB | SAS |
| Physical storage 2 | Physical parity group 2 | 60GB | SATA |

Fig. 9C

| Physical storage identifier | Physical pool identifier | Capacity |
|---|---|---|
| Physical storage 1 | Physical pool 1 | 60GB |

Fig. 9D

| Physical storage identifier | Physical volume identifier | User identifier | Physical pool identifier | Physical parity group identifier | Volume characteristic | Usability | Capacity |
|---|---|---|---|---|---|---|---|
| Physical storage 1 | Physical volume 1 | Host 1 | - | Physical parity group 1 | Internal | Used | 30GB |
| Physical storage 1 | Physical volume 2 | Physical pool 1 | - | Physical parity group 1 | Internal | Used | 30GB |
| Physical storage 1 | Physical volume 3 | Host 1 | Physical pool 1 | - | End | Used | 30GB |
| Physical storage 1 | Physical volume 4 | Host 1 | Physical pool 1 | - | End | Used | 30GB |

Fig. 9E

| Physical storage identifier | Physical volume identifier | User identifier | Physical pool identifier | Physical parity group identifier | Volume characteristic | Usability | Capacity |
|---|---|---|---|---|---|---|---|
| Physical storage 2 | Physical volume 1 | Host 2 | - | Physical parity group 1 | End | Used | 30GB |
| Physical storage 2 | Physical volume 2 | - | - | Physical parity group 1 | End | Unused | 30GB |
| Physical storage 2 | Physical volume 3 | - | - | Physical parity group 2 | End | Unused | 30GB |
| Physical storage 2 | Physical volume 4 | - | - | Physical parity group 2 | End | Unused | 30GB |

Fig. 10A

| Virtual storage identifier | Virtual volume identifier | Host identifier |
|---|---|---|
| Virtual storage apparatus 1 | Virtual volume 3 | Host 1 |
| Virtual storage apparatus 1 | Virtual volume 4 | Host 1 |
| Virtual storage apparatus 1 | Virtual volume 5 | Host 2 |
| Virtual storage apparatus 1 | Virtual volume 6 | Host 2 |
| Virtual storage apparatus 1 | Virtual volume 7 | Host 3 |
| Virtual storage apparatus 1 | Virtual volume 8 | Host 3 |

Fig. 10B

| Screen identifier | Resource identifier | Search condition | Search starting point | Management server information name |
|---|---|---|---|---|
| Virtual storage/Used volume | Virtual storage identifier | "Usability" = "Used" | Virtual volume information | - |
| Virtual storage/Unused volume | Virtual storage identifier | "Usability" = "Unused" | Virtual volume information | - |
| Virtual storage/Pool | Virtual storage identifier | "None" | Virtual pool information | - |
| Virtual storage/Parity group | Virtual storage identifier | "None" | Virtual parity group information | - |
| Physical storage/Used volume | Physical storage identifier | "Usability" = "Used" | Physical volume information | - |
| Physical storage/Unused volume | Physical storage identifier | "Usability" = "Unused" | Physical volume information | - |
| Physical storage/Pool | Physical storage identifier | "None" | Physical pool information | - |
| Physical storage/Parity group | Physical storage identifier | "None" | Physical parity group information | - |
| Host/Used volume | Host identifier | "User identifier" = "Variable id" | Virtual volume information | - |
| Host/Reserved volume | Host identifier | "Virtual volume identifier" = "?" | Virtual volume information | Volume reservation table |

| Virtual storage identifier (351a) | Physical storage identifier (351b) |
|---|---|
| Virtual storage 1 | Physical storage 1 |
| Virtual storage 1 | Physical storage 2 |

| Virtual storage identifier (352a) | Virtual parity group identifier (352b) | Physical storage identifier (352c) | Physical parity group identifier (352d) | Last update time (352e) |
|---|---|---|---|---|
| Virtual storage 1 | Virtual parity group 1 | Physical storage 1 | Physical parity group 1 | 2012-12-17 18:36 |
| Virtual storage 1 | Virtual parity group 2 | Physical storage 2 | Physical parity group 1 | 2012-12-17 18:36 |
| Virtual storage 1 | Virtual parity group 3 | Physical storage 2 | Physical parity group 2 | 2012-12-17 18:36 |

| Virtual storage identifier (353a) | Virtual pool identifier (353b) | Physical storage identifier (353c) | Physical pool identifier (353d) | Last update time (353e) |
|---|---|---|---|---|
| Virtual storage 1 | Virtual pool 1 | Physical storage 1 | Physical pool 1 | 2012-12-17 18:36 |

| Virtual storage identifier (354a) | Virtual volume identifier (354b) | Virtual pool identifier (354c) | User identifier (354d) | Virtual parity group identifier (354e) | Volume characteristic (354f) | Usability (354g) | Physical storage identifier (354h) | Physical volume identifier (354i) | Last update time (354j) |
|---|---|---|---|---|---|---|---|---|---|
| Virtual storage 1 | Virtual volume 1 | Virtual pool 1 | | Virtual parity group 1 | Internal | Used | Physical storage 1 | Physical volume 1 | 2012-12-17 18:36 |
| Virtual storage 1 | Virtual volume 2 | Virtual pool 1 | | Virtual parity group 1 | Internal | Used | Physical storage 1 | Physical volume 2 | 2012-12-17 18:36 |
| Virtual storage 1 | Virtual volume 3 | | Host 1 | | End | Used | Physical storage 1 | Physical volume 3 | 2012-12-17 18:36 |
| Virtual storage 1 | Virtual volume 4 | | Host 1 | | End | Used | Physical storage 1 | Physical volume 4 | 2012-12-17 18:36 |
| Virtual storage 1 | Virtual volume 5 | | Host 2 | Virtual parity group 2 | End | Used | Physical storage 2 | Physical volume 1 | 2012-12-17 18:36 |
| Virtual storage 1 | Virtual volume 6 | | | Virtual parity group 2 | End | Unused | Physical storage 2 | Physical volume 2 | 2012-12-17 18:36 |
| Virtual storage 1 | Virtual volume 7 | | | Virtual parity group 3 | End | Unused | Physical storage 2 | Physical volume 3 | 2012-12-17 18:36 |
| Virtual storage 1 | Virtual volume 8 | | | Virtual parity group 3 | End | Unused | Physical storage 2 | Physical volume 4 | 2012-12-17 18:36 |

| Physical storage identifier | Physical parity group identifier | Capacity | Type | Last update time |
|---|---|---|---|---|
| Physical storage 1 | Physical parity group 1 | 60GB | SSD | 2012-12-17 18:36 |
| Physical storage 2 | Physical parity group 1 | 60GB | SAS | 2012-12-17 18:36 |
| Physical storage 2 | Physical parity group 2 | 60GB | SATA | 2012-12-17 18:36 |

| Physical storage identifier | Physical pool identifier | Capacity | Last update time |
|---|---|---|---|
| Physical storage 1 | Physical pool 1 | 60GB | 2012-12-17 18:36 |

| Physical storage identifier | Physical volume identifier | User identifier | Physical pool identifier | Physical parity group identifier | Volume characteristic | Usability | Capacity | Last update time |
|---|---|---|---|---|---|---|---|---|
| Physical storage 1 | Physical volume 1 | Physical pool 1 | – | Physical parity group 1 | Internal | Used | 30GB | 2012-12-17 18:36 |
| Physical storage 1 | Physical volume 2 | Physical pool 1 | – | Physical parity group 1 | Internal | Used | 30GB | 2012-12-17 18:36 |
| Physical storage 1 | Physical volume 3 | Host 1 | Physical pool 1 | – | End | Used | 30GB | 2012-12-17 18:36 |
| Physical storage 1 | Physical volume 4 | Host 1 | Physical pool 1 | – | End | Used | 30GB | 2012-12-17 18:36 |
| Physical storage 2 | Physical volume 1 | Host 1 | – | Physical parity group 1 | End | Unused | 30GB | 2012-12-17 18:36 |
| Physical storage 2 | Physical volume 2 | – | – | Physical parity group 1 | End | Unused | 30GB | 2012-12-17 18:36 |
| Physical storage 2 | Physical volume 3 | – | – | Physical parity group 2 | End | Unused | 30GB | 2012-12-17 18:36 |
| Physical storage 2 | Physical volume 4 | – | – | Physical parity group 2 | End | Unused | 30GB | 2012-12-17 18:36 |

363a, 363b, 363c, 363d, 363e, 363f, 363g, 363h, 363i

CONFIGURATION INFORMATION ACQUISITION METHOD AND MANAGEMENT COMPUTER

TECHNICAL FIELD

The present invention relates to a technique for acquiring configuration information on resources in a storage system having a storage apparatus.

BACKGROUND ART

In recent years, sharply increased amounts of data have been used by corporations and individuals, and storage systems have been larger in scale and increased in complexity. To enable effective operations of such an entire storage system, there are methods by which a management computer manages integrally configuration information on the storage system including a storage apparatus, a host computer, and the like.

As a technique for acquiring configuration information on a storage system by a management computer, there has been disclosed a technique for acquiring configuration on a storage system at two stages, for example (for example, refer to PTL 1). According to this technique, at the first stage, only basic information on resources (identifiers, numbers, and relations among the resources) held in the storage system, the host computer, and the like are acquired from these apparatuses. Next, based on the acquired basic information, the range of detailed configuration information to be acquired, timing for acquisition of the detailed information, necessity of holding the detailed information are decided. Then, at the second stage, in the appropriate timing, the detailed configuration information in the appropriate range is acquired. Accordingly, the management computer can manage efficiently the configuration information on the storage system in an integrated fashion with respect to the information holding amount.

In addition, there has been realized an integral virtualization technique for integrating a plurality of storage apparatuses into another storage apparatus (for example, refer to PTL 2).

CITATION LIST

Patent Literature

[PTL 1] JP 2012-155544
[PTL 2] JP 2008-65561

SUMMARY OF INVENTION

Technical Problem

A management computer managing integrally a configuration of a storage system needs to acquire configuration information from the storage system at initial setup or recovery of the management computer (storage management server) from a server failure. Then, after completion of acquisition of the configuration information, the management computer enables management operations within the range of the acquired configuration information. For example, according to the technique disclosed in PTL 1, after completion of acquisition of the detailed information at the second stage, the management computer can perform management operations within the range of the acquired detailed information.

The acquisition of the configuration information requires time according to the scale of the number of resources in the entire storage system. In recent years, there have been increased numbers of storage apparatuses and host computers installed in data centers of corporations and others. Further, the apparatuses have been increased in complexity, and the numbers of resources managed by one apparatus have been also increased. In a storage system, in the case of using the integral virtualization technique for integrating a plurality of storage apparatuses into another storage apparatus, the management computer needs to handle both physical resources and virtual resources. According to the technique disclosed in PTL 1, to cope with an explosively increasing number of resources, if the range of detailed information to be acquired at the second stage is narrowed, the basic information on all the resources in the storage system is acquired at the first stage, and thus no significant reduction can be expected in the time of acquiring the configuration information. This causes a problem that a long time is taken for an administrator to acquire necessary information. In addition, there is another problem that the management computer cannot perform management operations for a long time until the configuration information is acquired.

Solution to Problem

The management computer managing one or more storage apparatuses managing a plurality of resources transmits to the one or more storage apparatuses requests for acquiring with higher priority configuration information on resources, of the plurality of resources, logically closer to a host computer in one or more storage apparatuses, based on one or more basic information pieces for identifying one or more storage apparatuses. The management computer receives the configuration information corresponding to the requests from the one or more storage apparatuses, and incorporates the received configuration information into configuration management information for managing configuration information on resources managed by the one or more storage apparatuses.

Advantageous Effects of Invention

It is possible to quickly acquire configuration information on resources required by an administrator.

BRIEF DESCRIPTION OF DRAWINGS

FIG. 8A is a configuration diagram of virtual storage information in a storage apparatus according to the embodiment, FIG. 8B is a configuration diagram of virtual parity group information in the storage apparatus according to the embodiment, FIG. 8C is a configuration diagram of virtual pool information in the storage apparatus according to the embodiment, and FIG. 8D is a configuration diagram of virtual volume information in the storage apparatus according to the embodiment.

FIG. 9A is a configuration diagram of one example of physical parity group information in the storage apparatus according to the embodiment, FIG. 9B is a configuration diagram of another example of physical parity group information in the storage apparatus according to the embodiment, FIG. 9C is a configuration diagram of physical pool information in the storage apparatus according to the embodiment, FIG. 9D is a configuration diagram of one example of physical volume information in the storage apparatus according to the embodiment, and FIG. 9E is a configuration diagram of another example of physical volume information in the storage apparatus according to the embodiment.

FIG. 10A is a configuration diagram of a volume reservation table in the storage management server according to the embodiment, and FIG. 10B is a configuration diagram of a screen table in the storage management server according to the embodiment.

FIG. 11A is a configuration diagram of virtual storage information in the storage management server according to the embodiment, FIG. 11B is a configuration diagram of virtual parity group information in the storage management server according to the embodiment, FIG. 11C is a configuration diagram of virtual pool information in the storage management server according to the embodiment, and FIG. 11D is a configuration diagram of virtual volume information in the storage management server according to the embodiment.

FIG. 12A is a configuration diagram of physical parity group information in the storage management server according to the embodiment, FIG. 12B is a configuration diagram of physical pool information in the storage management server according to the embodiment, and FIG. 12C is a configuration diagram of physical volume information in the storage management server according to the embodiment.

DESCRIPTION OF EMBODIMENTS

One embodiment will be described below. However, the embodiment described below does not limit the invention described in the claims, and all of constituents and combinations thereof described in relation to the embodiment are not necessarily essential to means to solve the problem addressed by the invention.

In the following description, various kinds of information may be described by the expression "aaa table". However, various kinds of information may be expressed in data structures other than tables. The "aaa table" of the kinds of information can be referred to as "aaa information" to indicate independence from data structures.

In the following description, "programs" may be expressed as a subject to perform processes. However, the programs are to be executed by a processor included in a controller (for example, CPU (central processing unit) to perform predetermined processes using as appropriate a storage resource (for example, memory) and/or a communication interface apparatus (for example, NIC (network interface card)), and thus the processor may be interpreted as a subject to perform the programs. Processes described to be performed by the programs may be expressed as processes to be performed by the controller. The controller may be a processor, and instead of or in addition to the processor, include a hardware circuit performing some or all of the processes to be performed by the processor. Computer programs may be installed into the apparatus from a program source. The program source may be a program distribution server or a storage media capable of being read by a computer, for example.

Figure 1:
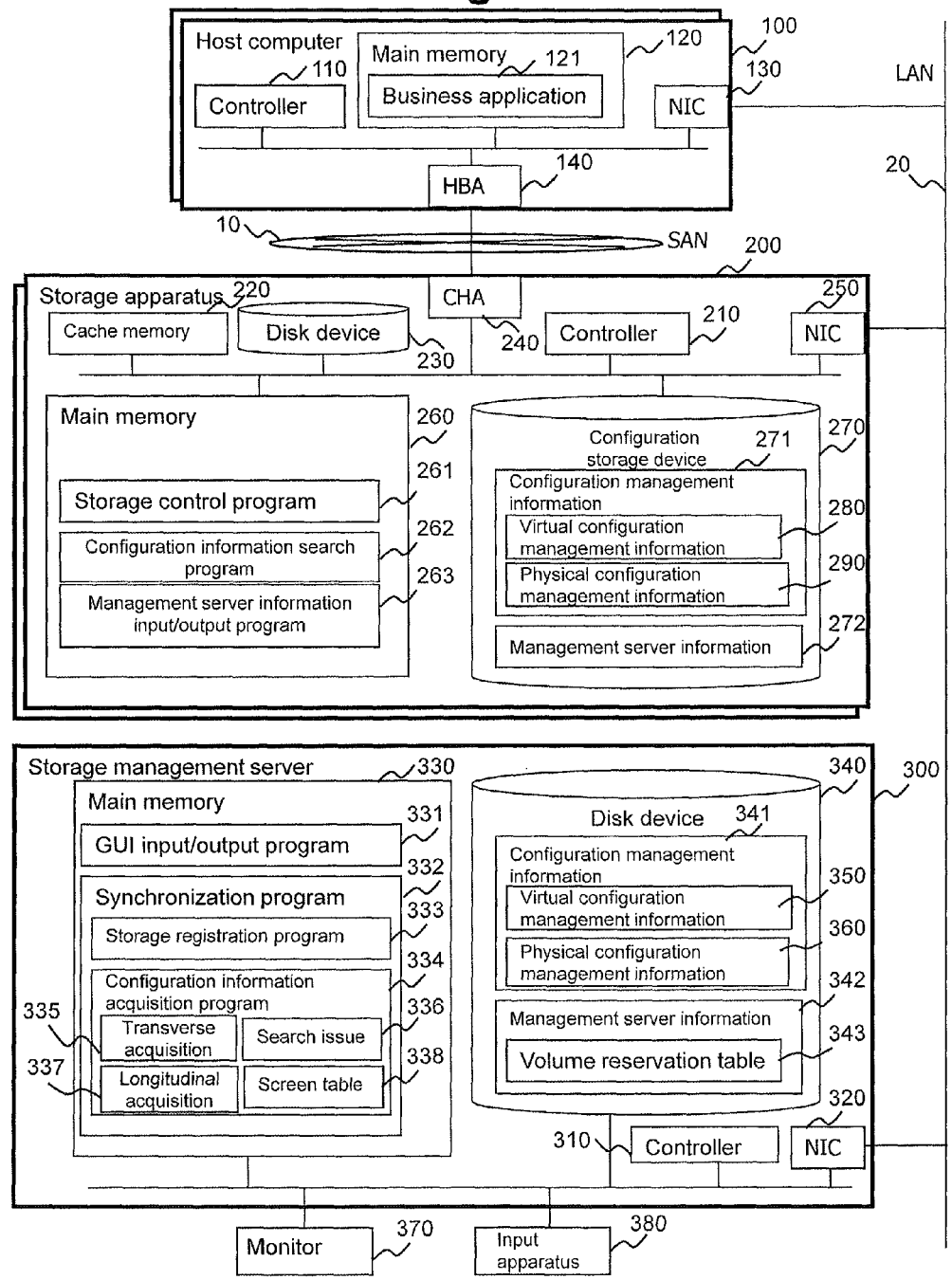
FIG. 1 is a hardware configuration diagram of a storage system according to an embodiment.

FIG. 1 is a hardware configuration diagram of a storage system according to the embodiment.

The storage system has one or more host computers 100, a plurality of storage apparatuses 200, and a storage management server 300 as one example of a management computer. The host computer 100 and the storage apparatuses 200 are coupled together via a communication network 10 such as a SAN (storage area network). The SAN may be a LAN (local area network) such as iSCSI. The host computer 100, the storage apparatuses 200, and the storage management server 300 are coupled together via a communication network 20 such as a LAN, for example.

The host computer 100 has a controller 110, a main memory 120, an NIC 130, and an HBA (host bus adapter) 140. The controller 110, the main memory 120, the NIC 130, and the HBA 140 are communicably coupled together via a bus.

The NIC 130 is a communication interface apparatus to communicate with the storage management server 300 and others via the communication network 20. The HBA 140 is a communication interface apparatus to communicate with the storage apparatuses 200 via the communication network 10. The controller 110 executes various programs stored in the main memory 120 to perform various processes.

The main memory 120 stores various programs and various kinds of information. The main memory 120 stores a business application 121, for example.

The business application 121 is a program to perform predetermined business processes using volumes (physical volumes and virtual logical volumes) provided by the plurality of storage apparatuses 200 via the communication network 10.

The storage apparatuses 200 each have a controller 210, a cache memory 220, a disk device 230, a CHA (channel adapter) 240, an NIC 250, a main memory 260, and a configuration storage device 270. To clearly differentiate from a virtual storage apparatus, the storage apparatuses 200 may be referred to as physical storage apparatuses 200. The controller 210, the cache memory 220, the disk device 230, the CHA 240, the NIC 250, the main memory 260, and the configuration storage device 270 are communicably coupled together via a bus.

The CHA 240 is a communication interface apparatus to communicate with the host computer 100 or other storage apparatuses 200 via the communication network 10. The NIC 250 is a communication interface apparatus to communicate with the storage management server 300 and others via the communication network 20. The cache memory 220 temporarily stores data to be written into the disk device 230 or data read from the disk device 230. The disk device 230 is one example of a physical storage device. Instead of or in addition to the disk device 230, a physical storage device having a flash memory and another semiconductor memory may be provided, for example. In the embodiment, for example, a plurality of disk devices 230 constitutes a group for storing data in a predetermined RAID (redundant array of independent disks) level (parity group (also called RAID group) according to RAID.

The controller 210 executes various programs stored in the main memory 260 to perform various processes. The main memory 260 stores various programs and various kinds of information. The main memory 260 stores a storage control program 261, a configuration information search program 262, and a management server information input/output program 263, for example.

The storage control program 261 provides the basic function of the storage apparatus 200. For example, the storage control program 261 performs the processes of clipping a volume from the disk device 230 in the storage apparatus 200 and providing the same as a logical volume to the host computer 100, storing temporary data in the cache memory 220 to improve I/O efficiency between the logical volume and the host computer 100, and providing the function of integrating the plurality of storage apparatuses 200 into one virtual storage apparatus (virtual storage apparatus) (called integral virtualization function).

The storage control program 261 also incorporates configuration information on physical resources (typically, physical storage resources) in the storage apparatus 200 into physical configuration management information 290 of the configuration storage device 270. The physical configuration management information 290 is information containing the configuration information on one or more physical resources included in the storage apparatus 200 with the physical configuration management information 290. The configuration information on a specified physical resource can be acquired from the physical configuration management information 290. In the case of using the integral virtualization function at the storage apparatus 200, the storage control program 261 also incorporates the configuration information on virtual resources (typically, virtual storage resources) in the virtual storage apparatus into virtual configuration management information 280 of the configuration storage device 270. The virtual configuration management information 280 is information containing configuration information on one or more virtual resources included in the virtual storage apparatus. The configuration information on a specified virtual resource can be acquired from the virtual configuration management information 280. The "incorporating the configuration information on resources into the configuration management information" here means updating the configuration management information using the configuration information on the resources, and specifically, means storing the configuration information in the configuration management information (adding information in the configuration information to the configuration management information) or rewriting information in the configuration management information using information in the configuration information.

The storage control program 261 also uses the integral virtualization function to synchronize the virtual configuration management information 280 among the plurality of storage apparatuses 200 constituting a virtual storage apparatus. Specifically, for example, in the case where any configuration change is made to the virtual storage apparatus, the storage control program 261 updates the virtual configuration management information 280 in the storage apparatus 200 executing the program 261, and after that, transmits the virtual configuration management information 280 after the update (or a difference between the virtual configuration management information 280 after the update and the virtual configuration management information 280 before the update) to all of the other physical storage apparatuses 200 constituting the virtual storage apparatus. Upon receipt of the virtual configuration management information 280 after the update (or the difference), the physical storage apparatuses 200 updates the virtual configuration management information 280 included in the storage apparatuses 200 using the received information. In such a manner as described above, the virtual configuration management information 280 is synchronized among all of the physical storage apparatuses 200 constituting the virtual storage apparatus.

The configuration information search program 262 is a program to perform processes of searching the configuration management information 271 in the configuration storage device 270 in response to a search request received from the storage management server 300 or another storage apparatus 200, and returning the search result to the requester.

The management server information input/output program 263 performs a process of saving the information transmitted from the storage management server 300 in the management server information 272 of the configuration storage device 270, in response to an input request from the storage management server 300. In addition, the management server information input/output program 263 performs a process of reading information from the management server information 272 of the configuration storage device 270 in response to an output request from the storage management server 300, and returning the same to the storage management server 300.

The configuration storage device 270 is formed by a storage device such as an HDD or a memory, for example. The configuration storage device 270 stores the configuration management information 271 and the management server information 272.

The configuration management information 271 refers to configuration information on resources (typically, storage resources) of the storage apparatuses 200, which includes the virtual configuration management information 280 and the physical configuration management information 290. The physical configuration management information 290 is information for managing configuration information of physical resources of the storage apparatuses 200. The virtual configuration management information 280 is information for managing configuration information of virtual resources of the virtual storage apparatus formed by the integral virtualization function. If the storage apparatuses 200 have no integral virtualization function, the virtual configuration management information 280 may be omitted.

The virtual configuration management information 280 includes virtual storage information 281 (refer to FIG. 8A), virtual parity group information 282 (refer to FIG. 8B), virtual pool information 283 (refer to FIG. 8C), and virtual volume information 284 (refer to FIG. 8D), for example. When one virtual storage apparatus is formed by a plurality of physical storage apparatuses 200, the virtual configuration management information 280 is synchronized among the physical storage apparatuses 200. Therefore, basically, when the storage apparatuses 200 constitute one and the same virtual storage apparatus, even if a configuration information search process described later is performed on any of the storage apparatuses 200, the same result is returned. Details of the information included in the virtual configuration management information 280 will be described later.

The physical configuration management information 290 includes physical parity group information 291 (refer to FIGS. 9A and 9B), physical pool information 292 (refer to FIG. 9C), and physical volume information 293 (refer to FIGS. 9D and 9E), for example. Details of the information will be described later.

The management server information 272 is information specified as to be saved by the storage management server 300.

The storage management server 300 has a controller 310 as one example of a control device, a main memory 330 and a disk device 340 as one example of a storage device, and an NIC 320. The controller 310, the main memory 330, the disk device 340, and the NIC 320 are communicably coupled together via a bus. In addition, the storage management server 300 is coupled to a monitor 370 and an input/output device 380 via a bus.

The NIC 320 is a communication interface apparatus for communications with the host computer 100 and the storage apparatuses 200 via the communication network 20. The controller 310 executes various programs stored in the main memory 330 to perform various processes.

The main memory 330 stores various programs and various kinds of information. The main memory 330 stores a GUI input/output program 331 and a synchronization program 332.

The GUI input/output program 331 performs a process for drawing on the monitor 370 GUI screens (refer to FIGS. 6, 7, and others) required for performing management operations of a storage system for an administrator (user). The GUI input/output program. 331 also performs a process for receiving input by the administrator from the input apparatus 380.

The synchronization program 332 is a program executed regularly (for example, once a day) as a daemon, for example. The synchronization program 332 may also be executed at an arbitrary timing according to an input by the administrator into the screen, in conjunction with the GUI input/output program 331.

The synchronization program 332 performs a process for transmitting the management server information 342 in the storage management server 300 to the storage apparatuses 200 to save the management server information in the storage apparatuses 200, or performs a process for receiving the management server information from the storage apparatuses 200 on recovery from a failure to recover the management server information in the storage apparatuses 200.

The synchronization program 332 includes a storage registration program 333 and a configuration information acquisition program 334. The storage registration program 333 is a program for registering the storage apparatuses 200 to be managed by the storage management server 300, in conjunction with the GUI input/output program 331.

The configuration information acquisition program 334 is a program for acquiring configuration information on resources of the storage apparatuses 200 from the storage apparatuses 200 and incorporating the acquired configuration information into the configuration management information 341 of the storage management server 300. The management information acquisition program 334 includes a transverse acquisition program 335, a search issue program 336, a longitudinal acquisition program 337, and a screen table 338. Details of the transverse acquisition program 335, the search issue program 336, the longitudinal acquisition program 337, and the screen table 338 will be described later.

The disk device 340 stores configuration management information 341 and management server information 342.

The configuration management information 341 is information containing configuration information on resources of the plurality of storage apparatuses 200 to be managed, and includes virtual configuration management information 350 and physical configuration management information 360. The virtual configuration management information 350 is configuration information on virtual resources of a virtual storage apparatus formed by the integral virtualization function based on the plurality of storage apparatuses 200 to be managed. The virtual configuration management information 350 is basically obtained by acquiring and collecting virtual configuration management information 280 in the storage apparatuses 200. The physical configuration management information 360 is configuration information on physical resources of the plurality of storage apparatuses 200 to be managed. The physical configuration management information 360 is obtained by acquiring and collecting the physical configuration management information 290 of the plurality of storage apparatuses 200.

The virtual configuration management information 350 includes virtual storage information 351 (refer to FIG. 11A), virtual parity group information 352 (refer to FIG. 11B), virtual pool information 353 (refer to FIG. 11C), and virtual volume information 354 (refer to FIG. 11D), for example. Details of the information will be described later.

The physical configuration management information 360 includes physical parity group information 361 (refer to FIG. 12A), physical pool information 362 (refer to FIG. 12B), and physical volume information 363 (refer to FIG. 12C), for example. Details of the information will be described later.

The management server information 342 is information for use in processes by the storage management server 300, and is basically not managed by the storage apparatuses 200 but can be saved in the storage management server 300. The management server information 342 includes a volume reservation table 343 for managing each of virtual volumes reserved for use by each of the host computers 100, for example. Details of the volume reservation table 343 will be described later. The management server information 342 is not limited to the volume reservation table 343 but may be information relating to customization of screens for each administrator or may be resource group information in which resources (e.g. volumes such as virtual volumes and/or physical volumes) are grouped by pre-decided unit (e.g. by project or department in a company or the like), for example. As described above, the management server information 342 includes information indicative of preset use definitions of specific resources. The use definitions may be changed as appropriate during operation of the storage system in the storage management server 300. The management server information 342 may be backed up from the storage management server 300 to at least one storage apparatus 200 at each update of the management server information 342 or on a regular basis as will be described later. The backup of the management server information 342 may be a backup of the entire information 342 or a backup of differential information between before and after the update.

The management server information 342 is information for use in processes by the storage management server 300 as described above, and thus may be stored in the storage management server 300. However, if a failure occurs at the storage management server 300, the management server information 342 may disappear. Thus, the storage management server 300 in the embodiment is configured to back up the management server information 342 in the storage apparatuses 200 so that, if necessary, the management server information 342 can be acquired from the storage apparatuses 200. Accordingly, it is possible to acquire the management server information 342 and use the same for process as appropriate even after occurrence of a failure at the storage management server 300.

Figure 2:
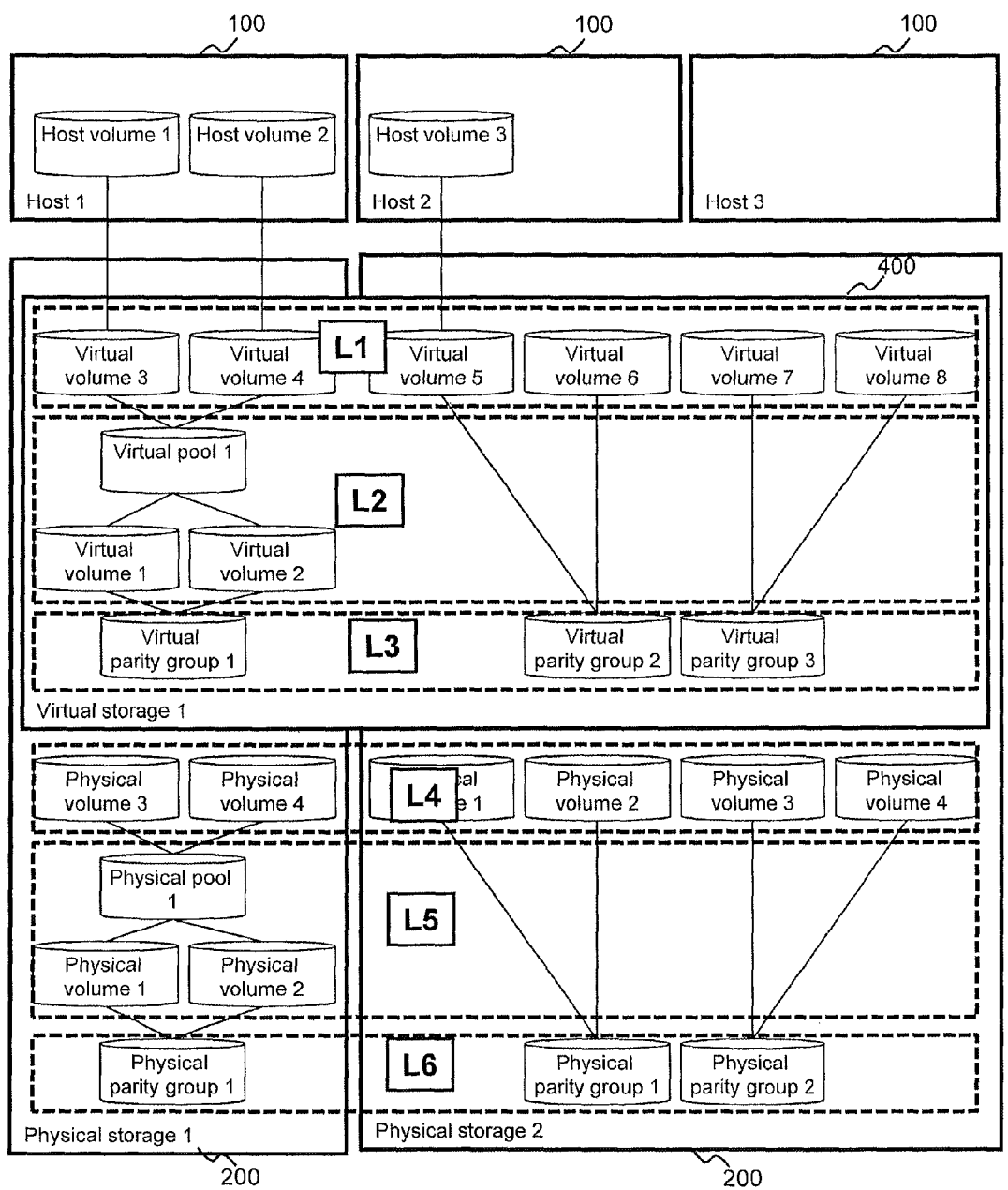
FIG. 2 is a logical configuration diagram of the storage system according to the embodiment.

FIG. 2 is a logical configuration diagram of a storage system according to the embodiment. FIG. 2 illustrates an example of a virtual storage apparatus 400 formed from the plurality of storage apparatuses 200 in the storage system by the integral virtualization function. In the following description, the host computers 100 will be referred to as host 1, host 2, and host 3, and the physical storage apparatuses 200 as physical storage 1 and physical storage 2, and the virtual storage apparatus 400 as a virtual storage 1.

The physical storage 1 has a parity group (physical parity group) 1 formed from a plurality of disk devices 230. The storage areas of the physical parity group 1 are cut into physical volume 1 and physical volume 2. The physical volumes 1 and 2 are each logical volumes for the physical storage 1.

The assembly of the physical volume 1 and the physical volume 2 is set as physical pool 1. Physical volume 3 and physical volume 4 are associated with the physical pool 1. Each of the physical volumes 3 and 4 is a kind of logical volume in conformity with Thin Provisioning, and is formed by a plurality of logical areas. The physical pool 1 is divided into a plurality of actual areas. For example, when a write operation is performed in a certain logical area of the physical volume 3, the physical storage 1 allocates an actual area from the physical pool 1 associated with the physical volume 3 to the logical area to be written.

The physical storage 2 has a physical parity group 1 and a physical parity group 2 formed by a plurality of disk devices 230. The storage area of the physical parity group 1 is cut into a physical volume 1 and a physical volume 2. The storage area of the physical parity group 2 is cut into a physical volume 3 and a physical volume 4.

Referring to FIG. 2, the virtual storage apparatus (virtual storage 1 in this example) is formed by the plurality of storage apparatuses (physical storage 1 and physical storage 2 in this example). The number of the virtual storage apparatus is not limited to one but may be two or more.

Virtual parity groups are formed by virtualizing physical parity groups, and correspond one by one to the physical parity groups. In the illustrated example, the physical parity group 1 of the physical storage 1 corresponds to the virtual parity group 1, and the physical parity groups 1 and 2 of the physical storage 2 correspond to the virtual parity groups 2 and 3, respectively.

Virtual pools are formed by virtualizing physical pools, and correspond one by one to physical pools. In the illustrated example, the physical pool 1 corresponds to the virtual pool 1.

Virtual volumes are formed by virtualizing physical volumes, and correspond one by one to the physical volumes. In the illustrated example, the physical volumes 1, 2, 3, and 4 of the physical storage 1 correspond to the virtual volumes 1, 2, 3, and 4, respectively, and the physical volumes 1, 2, 3, and 4 of the physical storage 2 correspond to the virtual volumes 5, 6, 7, and 8, respectively.

Virtual volumes are recognized by the host computer 100 and mounted as host volumes recognized by the host computer 100. In the illustrated example, the virtual volumes 3, 4, and 5 are mounted as host volumes 1, 2, and 3, respectively. The virtual volumes recognized by the host computer 100 are on-line virtual volumes. Off-line virtual volumes (for example, virtual volumes constituting virtual pools) are not recognized by the host computer 100. In the illustrated example, when I/O takes place with respect to the host volume 1, the host 1 issues an I/O request with respect to the virtual volume 3.

Host volumes are logical volumes allocated to the host computer 100. In the case of using the integral virtualization function, the host volumes are generally allocated virtual volumes as described above. Alternatively, physical volumes may be directly allocated to the host volumes.

In the embodiment, resources including physical parity groups, physical volumes, physical pools, virtual parity groups, virtual pools, and virtual volumes are cut into a plurality of layers according to logical proximity to the host computer 100. In the embodiment, the layers are basically set as assembles of resources of the same kinds. The logical proximity to the host computer 100 here refers to closeness to a target resource from a resource of the host computer 100. In other words, when the host computer 100 transmits an I/O (input/output) request (write request or read request) to the virtual storage apparatus, I/O takes place in sequence from a resource as a starting I/O destination specified by the I/O request to a resource as a final I/O destination associated with the starting resource. Then, I/O may take place through one or more resources until completion of I/O to the resource as final I/O destination. In the series of I/O processes, the starting resource is a resource logically closest to the host computer 100, and the resource as final I/O destination is a resource logically farthest from the host computer 100. That is, in the series of I/O processes, the resources undergone I/O (accessed) earlier are resources logically closer to the host computer 100. Specifically, as for virtual volumes, virtual pools, and virtual parity groups as virtual resources, the virtual volumes associated with host volumes in the host computer 100 are the closest resources, followed by the virtual pools and then the virtual parity groups. In addition, as for physical volumes, physical pools, and physical parity groups as physical resources, the physical volumes are the closest to the host computer 100, followed by the physical pools and then the physical parity groups.

In general, when virtual resources exist, the virtual resources are frequently associated with the resources of the host computer 100, and the physical resources are associated with the virtual resources, and thus the administrator manages mainly the virtual resources. Accordingly, in the embodiment, the virtual resources are logically closer to the host computer 100 than the physical resources.

In the embodiment, one or more virtual volumes capable of being allocated to host volumes, that is, the virtual volumes cut out from the virtual pools, or the virtual volumes cut out from the virtual parity groups (hereinafter, also referred to as end virtual volumes) are set in a layer L1, one or more virtual pools and virtual volumes not capable of being allocated to host volumes (internal virtual volumes) are set in a layer L2, one or more virtual parity groups are set in a layer L3, one or more physical volumes capable of being allocated to host volumes, that is, physical volumes cut out form physical pools or physical volumes cut out form physical parity groups (hereinafter, also referred to as end physical volumes) are set in a layer L4, one or more physical pools and physical volumes not capable of being allocated to the host volume (internal physical volumes) are set in a layer L5, and one or more physical parity groups are set in a layer L6. In the embodiment, the layer L1, layer L2, . . . , layer L6 are logically closer to the host computer 100 in this order.

Figure 3:
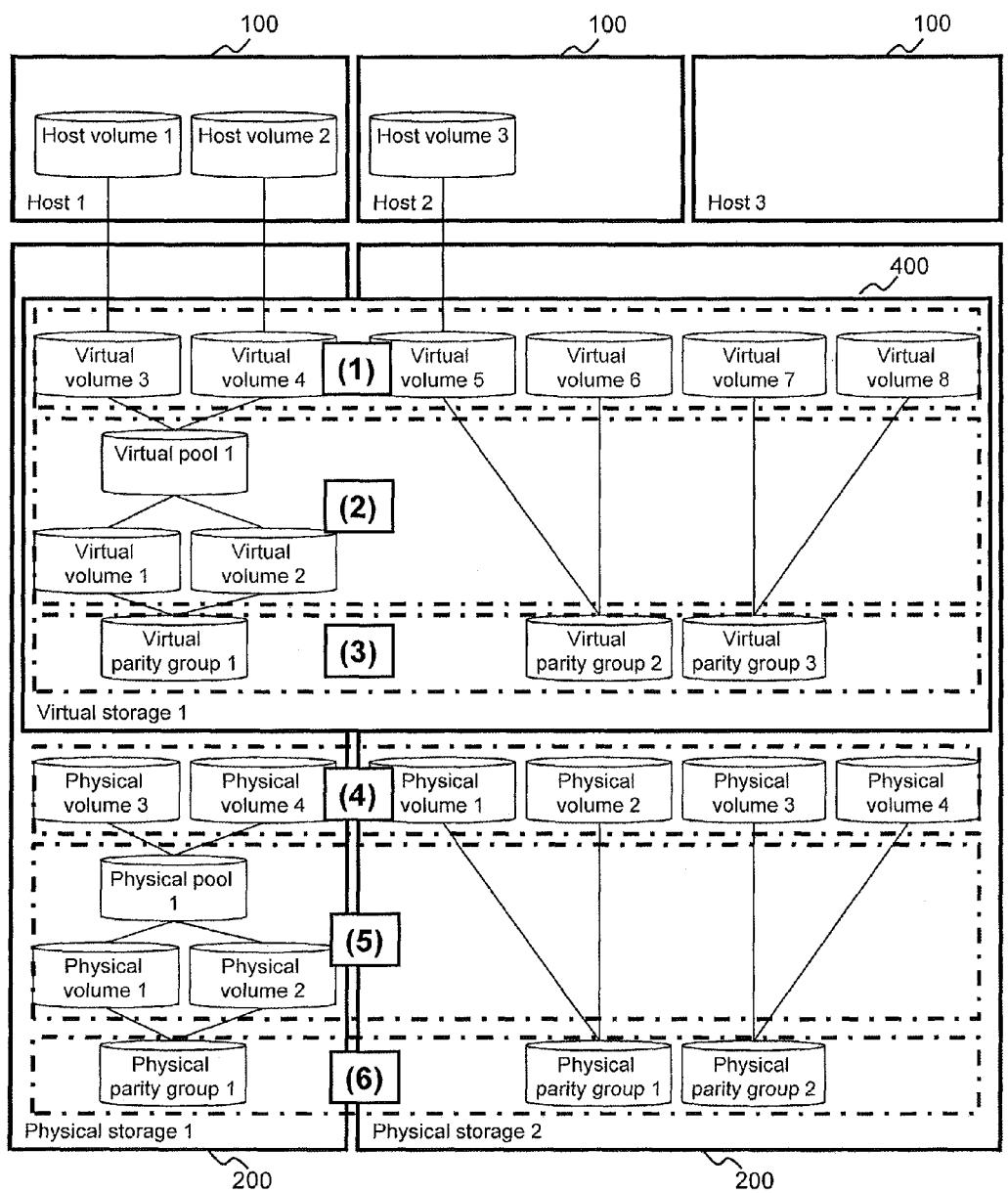
FIG. 3 is a diagram illustrating the overview of a first example of a configuration information acquisition method according to the embodiment.

FIG. 3 is a diagram illustrating the overview of a first example of a configuration information acquisition method according to the embodiment.

FIG. 3 illustrates the overview of a configuration information acquisition method in the case where the range of resources on which configuration information is to be acquired as a priority is not specified by the administrator's operation.

The storage management server 300 acquires configuration information on resources in the layers, sequentially from the layers closer to the host computer 100. Acquisition of configuration information on a plurality of resources in one and the same layer here refers to transverse acquisition.

Specifically, the storage management server 300 acquires configuration information on all of the virtual volumes (end virtual volumes) belonging to the layer L1 (refer to FIG. 3 (1)). After acquiring the configuration information on the virtual volumes in the layer L1 as described above, the storage management server 300 can accept from the administrator the most basic storage management operations for allocating the end virtual volumes to the host computers 100, and performs the same. Therefore, it is possible to perform some of the storage management operations without having to acquire the configuration information on all of the resources.

Next, the storage management server 300 acquires configuration information on all of the virtual pool and the internal virtual pools belonging to the layer L2 (refer to FIG. 3 (2)). After acquiring the configuration information on the virtual pool and the internal virtual pools in the layer L2 as described above, the storage management server 300 can accept from the administrator storage management operations such as an operation of cutting out a new virtual volume from the virtual pool and an operation of structuring a new virtual pool with the use of the end virtual volumes acquired at the step of FIG. 3 (1), and perform the same.

Next, the storage management server 300 acquires configuration information on all of the virtual parity groups belonging to the layer L3 (refer to FIG. 3 (3)). After acquiring the configuration information on the virtual parity groups in the layer L3 as described above, the storage management server 300 can accept from the administrator storage management operations such as an operation of cutting out a new virtual volume from the virtual parity group, and perform the same.

Then, the storage management server 300 acquires configuration information on all of the physical volumes belonging to the layer L4 (refer to FIG. 3 (4)). After acquiring the configuration information on the physical volumes in the layer L4 as described above, the storage management server 300 can accept from the administrator a storage management operation of allocating the end physical volumes to the host computers, and perform the same. The storage management server 300 also has information indicative of the correspondences between the virtual volumes acquired at the step of FIG. 3 (1) and the physical volumes, and thus can provide to the administrator the physical characteristics of the virtual volumes. This allows the administrator to determine appropriate virtual volumes to be allocated to the host computers, based on the more detailed physical information.

Then, the storage management server 300 acquires configuration information on all of the physical pool and the internal physical volumes belonging to the layer L5 (refer to FIG. 3 (5)). After acquiring the configuration information on the physical pool and the internal physical volumes in the layer L5 as described above, the storage management server 300 can accept from the administrator storage management operations such as an operation of cutting out a new physical volume from the physical pool and an operation of structuring a new physical pool with the use of the end physical volumes acquired at the step of FIG. 3 (4), and perform the same. The storage management server 300 also has information indicative of the correspondences between the virtual pools acquired at the step of FIG. 3 (2) and the physical pool, and thus can provide to the administrator the physical characteristics of the virtual volumes.

Then, the storage management server 300 acquires configuration information on all of the physical parity groups belonging to the layer L6 (refer to FIG. 3 (6)). After acquiring the configuration information on the physical parity groups in the layer L6 as described above, the storage management server 300 can accept from the administrator storage management operations such as an operation of cutting out a new physical volume from the physical parity group, and perform the same. The storage management server 300 also has information indicative of the correspondences between the virtual parity groups acquired at the step of FIG. 3 (3) and the physical parity groups, and thus can provide to the administrator the physical characteristics of the virtual parity groups.

When the storage system does not use the integral virtualization function, there exist no virtual resources to be processed at the steps (1) to (3) of FIG. 3, and thus the storage management server 300 does not perform the processes for acquiring the configuration information on these virtual resources.

The configuration information on the virtual resources of the virtual storage apparatus 400 is acquired as a higher priority than the configuration information on the physical resources of the physical storage apparatuses 200 because it is considered that the administrator using the integral virtualization function mainly performs storage management on the virtual resources of the virtual storage apparatus 400, and thus the administrator wishes to refer to and manage the configuration information of the virtual storage apparatus 400 as a higher priority. In addition, at the stage at which the configuration information on the virtual resources is acquired at the steps (1) to (3) of FIG. 3, it is not possible to refer to the physical characteristics of the virtual resources, but it is possible to change the mapping relationship between the virtual resources and the physical resources later using the integral virtualization function. For example, it is possible to allocate the virtual volumes in advance to the host computers 100 based on the configuration information on the virtual resources of the virtual storage apparatus 400, and then when the physical characteristics of the virtual volumes are known, change the mapping relationship between the physical volumes and the virtual volumes.

Figure 4:
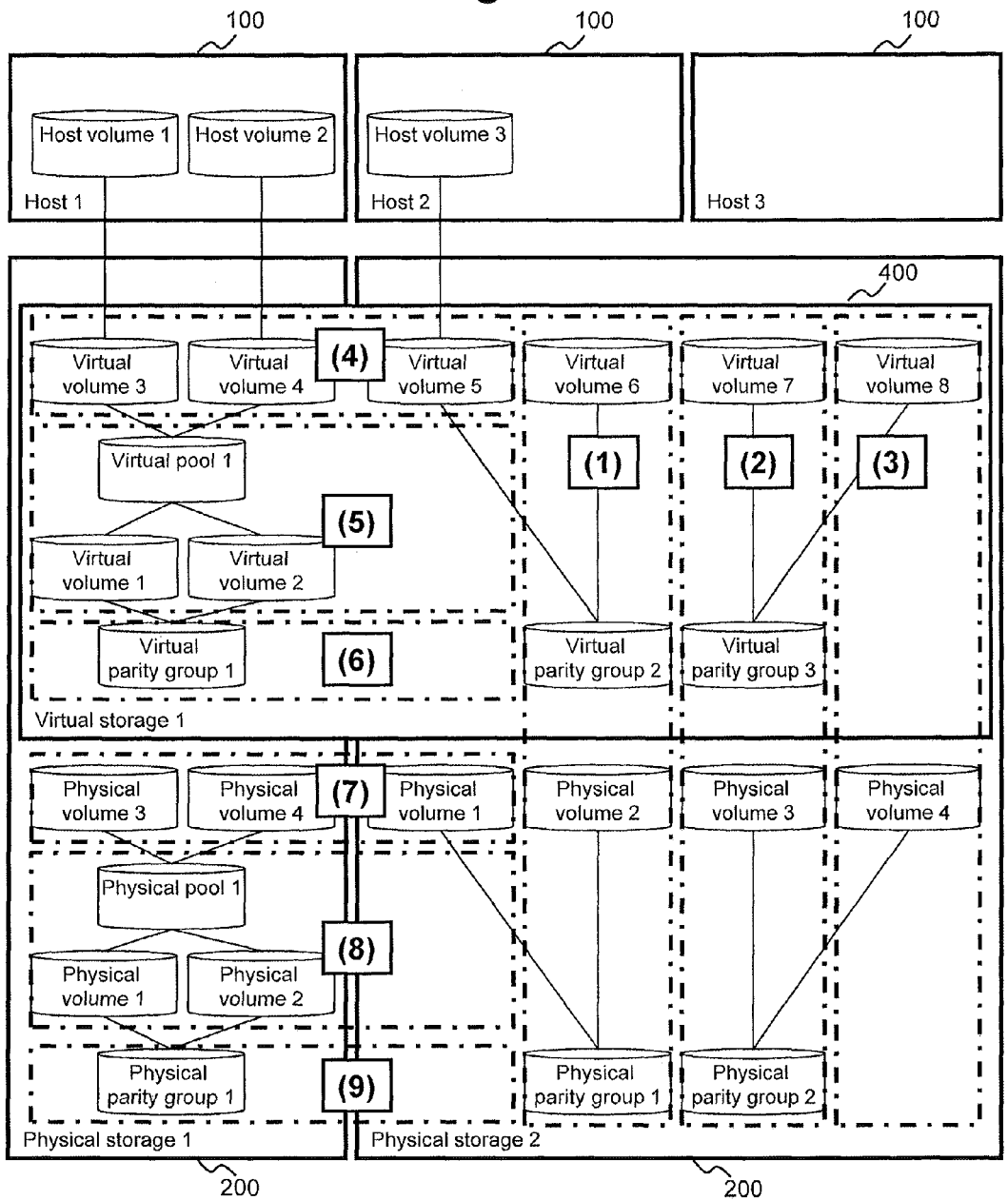
FIG. 4 is a diagram illustrating the overview of a second example of a configuration information acquisition method according to the embodiment.

FIG. 4 is a diagram illustrating the overview of a second example of a configuration information acquisition method according to the embodiment.

FIG. 4 illustrates the overview of a configuration information acquisition method in the case where the storage management server 300 can specify the range of resources on which configuration information is to be acquired as a priority, by the administrator's operation on the screen. More specifically, FIG. 4 illustrates the overview of a configuration information acquisition method in the case where the storage management server 300 specifies unused volumes (virtual volumes 6, 7, and 8 in this example) as range of resources on which the configuration information is to be acquired. In this case, the storage management server 300 acquires the configuration information on the unused volumes as a priority.

Specifically, for each of the unused volumes specified as resources on which the configuration information is to be acquired, the storage management server 300 acquires configuration information on the resource of the volume and configuration information on resources related to the resource, sequentially from the layers closer to the host computer 100. The acquisition of the configuration information on a certain resource and the configuration information on resources related to the resource according to the order of layers will be referred to as longitudinal acquisition.

In the example of FIG. 4, the storage management server 300 acquires configuration information on the virtual volume 6, acquires configuration information on the virtual parity group 2 related to the virtual volume 6, acquires configuration information on the physical volume 2 related to the virtual volume 6, and acquires configuration information on the physical parity group 1 related to the physical volume 2 (refer to FIG. 4 (1)). Similarly, the storage management server 300 acquires configuration information on the virtual volume 7, and sequentially acquires configuration information on the virtual parity group 3, physical volume 3, and physical parity group 2 related to the virtual volume 7 (refer to FIG. 4 (2)). The storage management server 300 also acquires configuration information on the virtual volume 8 and acquires information on the physical volume 4 related to the virtual volume 8 (refer to FIG. 4 (3)).

By executing the longitudinal acquisition (refer to (1) to (3) of FIG. 4), the storage management server 300 can acquire, for each of the virtual volumes, in sequence the configuration information on the related virtual resource and physical resource(s), for example. In the course of the longitudinal acquisition, a gradually increasing number of volumes appear over time on the screen displayed by the storage management server 300. The administrator can select an arbitrary volume at desired timing from the displayed volumes and specifies an arbitrary storage management operation to perform the storage management operation at the storage management server 300. Therefore, the administrator can early grasp the configuration information on resources related to the operation performed on the screen and early perform operations on the resources.

After performing the steps (1) to (3) of FIG. 4, the storage management server 300 performs steps (4) to (9) of FIG. 4 on the resources having not undergone the longitudinal acquisition. The steps (4) to (9) of FIG. 4 are steps for transverse acquisition similar to the steps (1) to (6) of FIG. 3.

Figure 5:
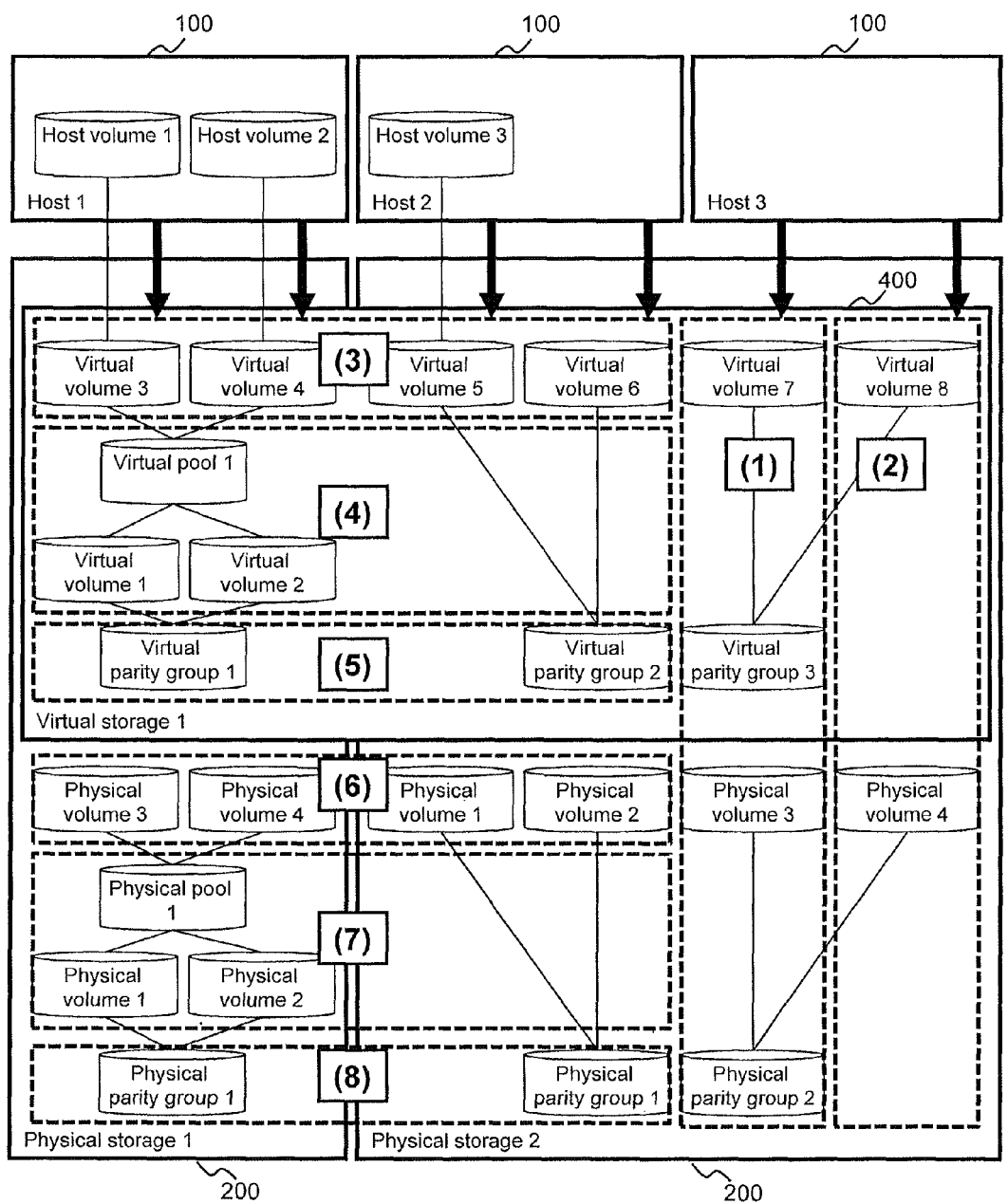
FIG. 5 is a diagram illustrating the overview of a third example of a configuration information acquisition method according to the embodiment.

FIG. 5 is a diagram illustrating the overview of a third example of a configuration information acquisition method according to the embodiment.

FIG. 5 illustrates the overview of a configuration information acquisition method in the case where the storage management server 300 can specify the range of resources on which configuration information is to be acquired as a priority, based on the operation performed by the administrator on the screen and the management server information 342 managed in advance by the storage management server 300.

The management server information 342 is information (volume reservation table 343) indicating which of host computers has reserved which of virtual volumes, for example. In the example of FIG. 5, as illustrated by arrows, the host 1 reserves the virtual volumes 3 and 4, the host 2 reserves the virtual volumes 5 and 6, the host 3 reserves the virtual volumes 7 and 8, as volumes to be used, and this matter is stored as management server information 342 in the storage management server 300.

When the storage management server 300 recognizes from the administrator's operation that the configuration information on the virtual volumes reserved by the specific host computer 100 (host 3 in this example) is to be acquired as a priority, based on the management server information, the storage management server 300 specifies the volumes reserved for use by the host 3 (virtual volumes 7 and 8 in this example) as resources on which configuration information is to be acquired as a priority.

The storage management server 300 executes transverse acquisition on the specified virtual volumes 7 and 8 (refer to (1) and (2) of FIG. 5). The process and effect of the longitudinal acquisition are the same as those of the transverse acquisition illustrated in FIG. 4.

After performing the steps (1) and (2) of FIG. 5, the storage management server 300 performs steps (3) to (8) of FIG. 5 on the resources having not undergone the longitudinal acquisition. The steps (3) to (8) of FIG. 5 are the same as the steps of transverse acquisition (1) to (6) of FIG. 3.

The management server information 342 in this example (information indicating which of the host computers has reserved which of the virtual volumes for use) is managed at the storage management server 300 but is not managed at the storage apparatuses 200. Accordingly, the storage management server 300 performs the process for specifying the virtual volumes reserved as volumes to be used by the host computers 100. In addition, the management server information 342 in this example may disappear on occurrence of a failure at the storage management server 300. Thus, the management server information 342 may be saved in the storage apparatuses 200 on the regular basis so that the management server information 342 can be recovered from the storage apparatuses 200 in the case of disappearance. According to this method, it is possible to specify the appropriate range of resources on which the configuration information is to be acquired as a priority, based on the management server information 342.

Figure 6:
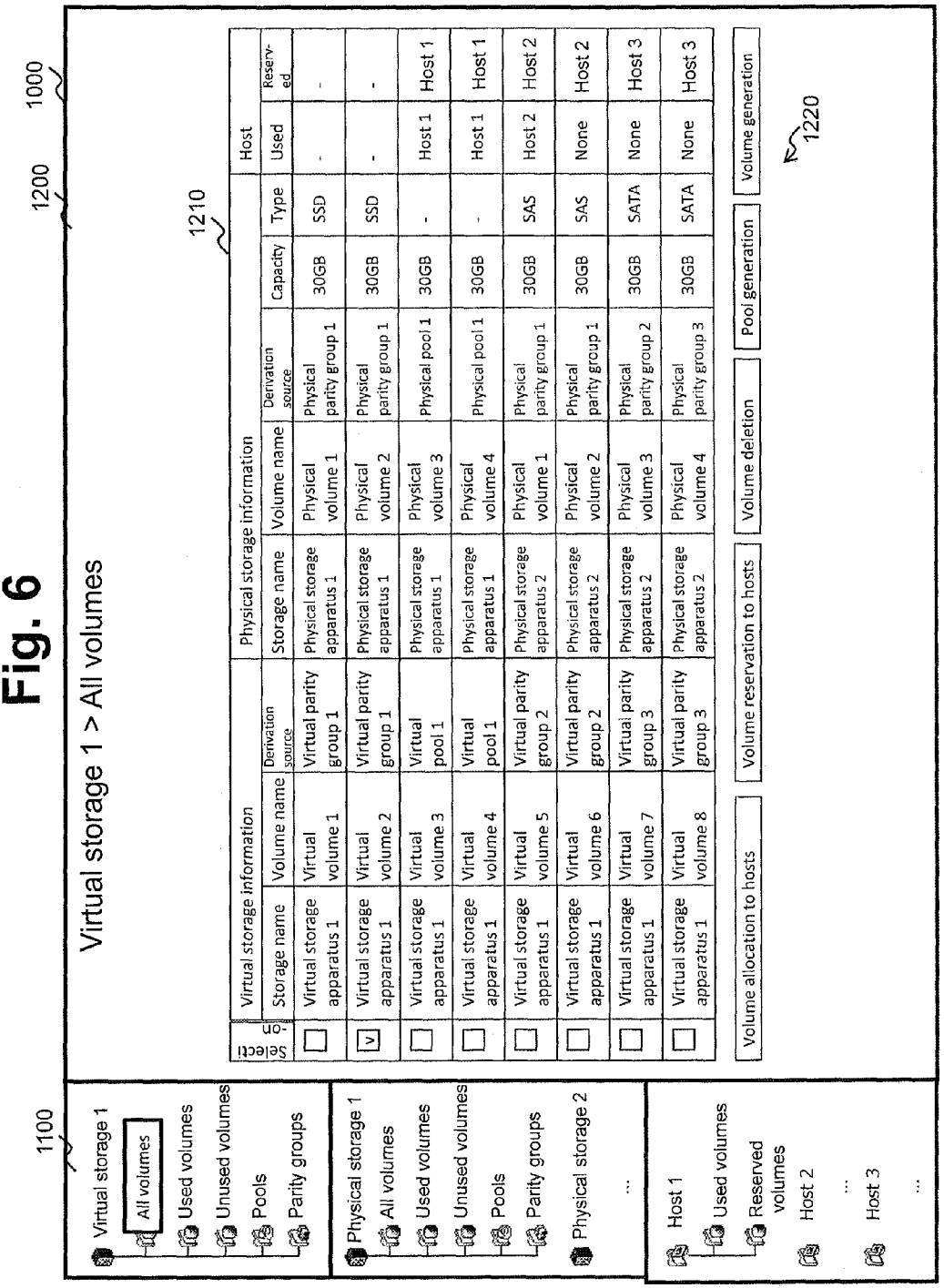
FIG. 6 is a configuration diagram of one example of a GUI screen displayed by a storage management server according to the embodiment.

FIG. 6 is a configuration diagram of one example of a GUI screen displayed by a storage management server according to the embodiment. FIG. 6 illustrates a GUI screen displayed by the storage management server 300 after acquiring the configuration information on all of the resources in the storage system.

The GUI screen 1000 is a screen for the administrator to perform storage management operations, and is configured to display information on resources in the storage system and accept input of indications for operations on the resources.

The GUI screen 1000 has a tree display area 1100 and a detailed information display area 1200.

Displayed in the tree display area 1100 are trees having typical resource names of the storage apparatuses 200 and the host computers 100 as nodes (one example of resource information). The administrator can select a node from the tree to change the contents of display in the detailed information display area 1200.

The detailed information display area 1200 has: a table display area 1210 in which detailed information on one or more resources corresponding to a node selected by the administrator in the tree display area 1100 is displayed in a table form, for example; and an operation button area 1220 in which one or more management operation buttons for accepting storage management operations on resources selected in the table display area 1210 are displayed. The detailed information on the resources is displayed in the table display area 1210 by the GUI input program 331 using the configuration management information 341 and the management server configuration information 342 in the disk device 340.

Figure 7:
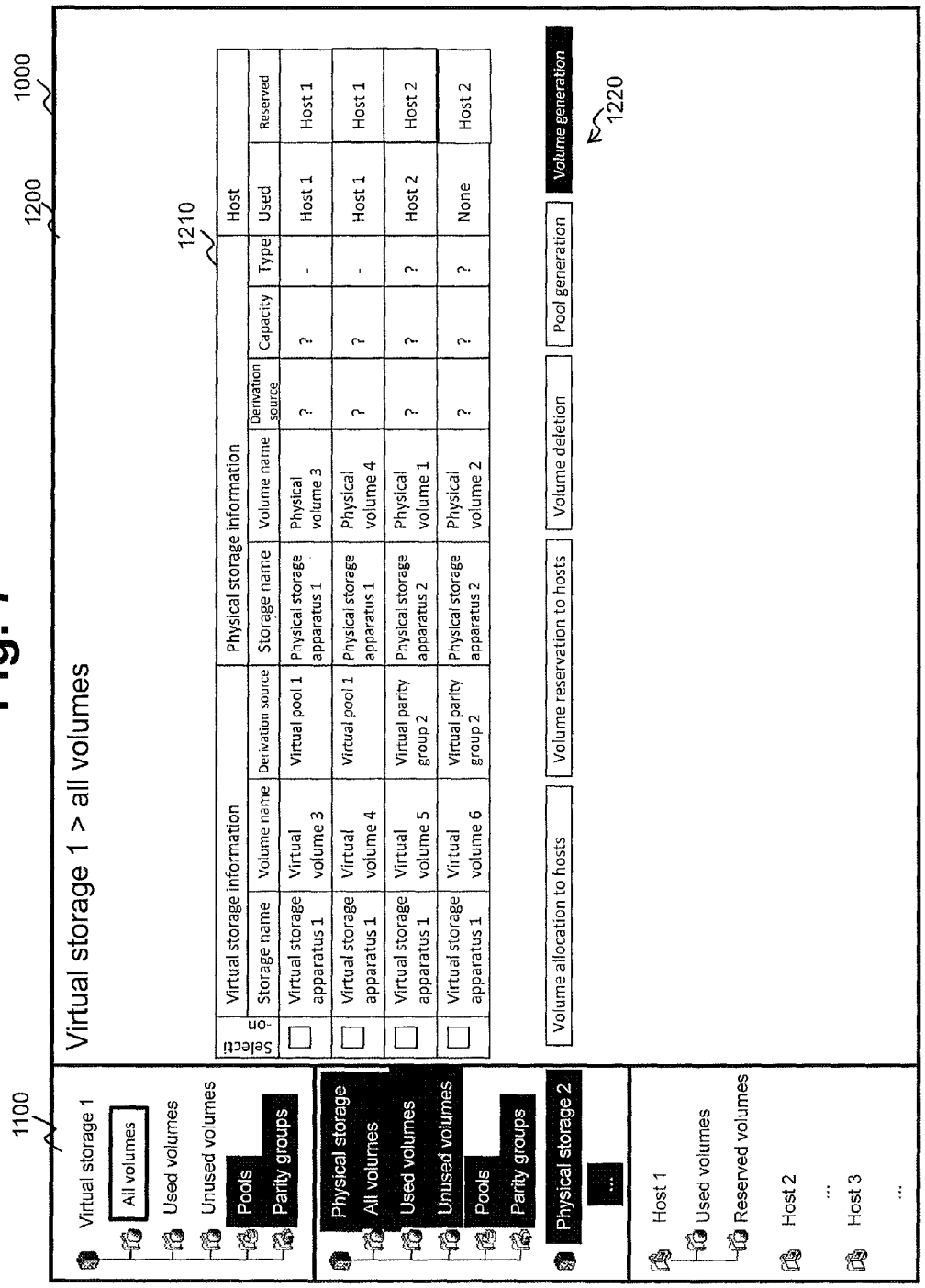
FIG. 7 is a configuration diagram of another example a GUI screen displayed by the storage management server according to the embodiment.

FIG. 7 is a configuration diagram of another example of a GUI screen displayed by the storage management server according to the embodiment. FIG. 7 illustrates one example of a GUI screen in the course of the configuration information acquisition process performed by the storage management server 300 to acquire configuration information on resources in the storage system, specifically, one example of a GUI screen in the course of acquisition of the configuration information on the end virtual volumes illustrated in FIG. 3 (1).

In the tree display area 1100 of the GUI screen 1000, nodes on which configuration information is not yet acquired are displayed in the mode indicating that the configuration information is not yet acquired (non-acquired mode: white-on-black display, for example). In the example of FIG. 7, since the configuration information on the virtual end volumes in the layer L1 is being acquired, the configuration information on the resources, virtual pools, and virtual parity groups in the physical storage apparatus 200 to be subsequently acquired is not yet acquired. Thus, the nodes corresponding to the recourses are displayed in the non-acquired mode.

In the tree display area 1100, the administrator can also select nodes in the non-acquired mode. When any node in the non-acquired mode is selected, no configuration information on the resource corresponding to the node exists immediately after the selection, and thus nothing is displayed in the table display area 1210 of the detailed information display area 1200. However, by the selection of the node, the administrator can notify the contents of the administrator's operation (for example, the resource of the node the administrator wishes to operate) to the storage management server 200. In the embodiment, the storage management server 200 can switch processes to acquire as a priority the configuration information on resources required for display on the screen, according to the contents of the administrator's operation. It is thus possible to relatively early display the detailed information on the resources desired by the administrator in the detailed information display area 1200 and increase storage management operations capable of being performed by the administrator.

Displayed in the table display area 1210 of the detailed information display area 1200 is information on volumes on which detailed information is already acquired. At the time point when the screen is displayed, some records (in which detailed information on the virtual volumes 7 and 8 is to be stored) are still not acquired, and thus the records are not displayed. Nevertheless, when the detailed information on the virtual volumes 7 and 8 is acquired after a lapse of time, the records corresponding to the volumes are sequentially displayed. At the time point when the screen is displayed, no configuration information to be stored in columns for the physical volumes and physical characteristics of the records (columns indicative of derivation source, capacity, and type) in the table display area 1210 is acquired, and thus the mark "?" indicative of non-acquired state is displayed in the columns. When the configuration information on the resources in the storage apparatuses 200 is acquired after a lapse of time, the acquired values are displayed instead of the mark "?".

In the operation button area 1220, the management operation buttons corresponding to management operations incapable of being performed at the time point when the screen is displayed are displayed in the mode indicating that the management operations cannot be performed (non-executable mode: white-on-black mode, for example). For example, the operation of volume generation corresponding to "volume generation" button cannot be performed unless there exists configuration information on the virtual parity groups or the virtual pools. At the time point when the screen is displayed, the applicable configuration information is not stored in the storage management server 300, and thus the button is displayed in the non-executable mode. When the configuration information on the virtual pools is acquired after a lapse of time, the operation of volume generation becomes enabled. Accordingly, the "volume generation" button is displayed not in the non-executable mode but the mode indicating that volume generation is executable.

FIG. 8A is a configuration diagram of virtual storage information in the storage apparatus according to the embodiment.

The virtual storage information 281 is information indicating on which of the physical storage apparatuses a virtual storage apparatus is structured. According to the virtual storage information 281, for example, it is possible to specify with which of the physical storage apparatuses the virtual configuration management information 280 is to be synchronized.

The virtual storage information 281 is configured in a table form, for example, to store records including fields for virtual storage identifier 281*a* and physical storage identifier 281*b*. Stored in the virtual storage identifier 281*a* are identifiers for uniquely identifying virtual storage apparatuses (virtual storage identifiers). When the integral virtualization function is not used at the physical storage apparatuses 200, the mark "−" indicative of invalid value is stored in the virtual storage identifier 281*a*. Stored in the physical storage identifier 281*b* are identifiers for uniquely identifying the physical storage apparatuses 200 constituting a virtual storage apparatus corresponding to the virtual storage identifier in the same record (physical storage identifiers).

FIG. 8B is a configuration diagram of virtual parity group information in the storage apparatus according to the embodiment.

The virtual parity group information 282 is configured in a table form, for example, to store records including fields for virtual storage identifier 282*a*, virtual parity group identifier 282*b*, physical storage identifier 282*c*, and physical parity group identifier 282*d*.

Stored in the virtual storage identifier 282*a* are virtual storage identifiers for uniquely identifying virtual storage apparatuses. Stored in the virtual parity group identifier 282*b* are identifiers for uniquely identifying virtual parity groups (virtual parity group identifiers). Stored in the physical storage identifier 282*c* are physical storage identifiers for the physical storage apparatuses 200 having the physical parity groups allocated to the virtual parity groups corresponding to the virtual parity group identifiers in the same record. Stored in the physical parity group identifier 282d are physical parity group identifiers for the physical parity groups allocated to the virtual parity groups corresponding to the virtual parity group identifiers in the same record.

According to the virtual parity group information 282, it is possible to specify to which of the physical parity groups corresponds to the virtual parity groups from combinations of the physical storage identifiers and the physical parity group identifiers.

FIG. 8C is a configuration diagram of virtual pool information in the storage apparatus according to the embodiment.

The virtual pool information 283 is configured in a table form, for example, to store records including fields for virtual storage identifier 283a, virtual pool identifier 283b, physical storage identifier 283c, and physical pool identifier 283d.

Stored in the virtual storage identifier 283a are virtual storage identifiers for uniquely identifying virtual storage apparatuses. Stored in the virtual pool identifier 283b are identifiers for uniquely identifying virtual pools (virtual pool identifiers). Stored in the physical storage identifier 283c is a physical storage identifier for the physical storage apparatus 200 having the physical pool allocated to the virtual pool corresponding to the virtual pool identifier in the same record. Stored in the physical pool identifier 283d are physical pool identifiers for the physical pools allocated to the virtual pools corresponding to the virtual pool identifiers in the same record.

According to the virtual pool information 283, it is possible to specify to which of the physical pools the virtual pool corresponds from a combination of the physical storage identifier and the physical pool identifier.

FIG. 8D is a configuration diagram of virtual volume information in the storage apparatus according to the embodiment.

The virtual volume information 284 is configured in a table form, for example, to store, for each of virtual volumes, records including fields for virtual storage identifier 284a, virtual volume identifier 284b, user identifier 284c, virtual pool identifier 284d, virtual parity group identifier 284e, volume characteristic 284f, usability 284g, physical storage identifier 284h, and physical volume identifier 284i.

Stored in the virtual storage identifier 284a are virtual storage identifiers for uniquely identifying virtual storage apparatuses. Stored in the virtual volume identifier 284b are identifiers for uniquely identifying virtual volumes in the virtual storage apparatus (virtual volume identifiers). Stored in the user identifier 284c are identifiers for identifying users of the virtual volumes in the same record (user identifiers). For example, when the host computer 100 uses a volume, the identifier for uniquely identifying the host computer 100 (host identifier) is stored in the user identifier 284c. In the case of a virtual volume used by a virtual pool, that is, a virtual volume constituting a virtual pool (called internal virtual volume), the virtual pool identifier for the virtual pool is stored. Stored in the virtual pool identifier 284d are virtual pool identifiers for virtual pools obtained by cutting out virtual volumes corresponding to the record. When a virtual volume corresponding to the record is not a virtual volume cut out from a virtual pool, the mark "–" indicative of invalid value is stored in the virtual pool identifier 284d. Stored in the virtual parity group identifier 284e are virtual parity group identifiers for virtual parity groups obtained by cutting out virtual volumes corresponding to the record. When a virtual volume corresponding to the record is not cut out directly from a virtual parity group, for example, when the virtual volume is cut out from a virtual pool, the mark "–" indicative of invalid value is stored in the virtual parity group identifier 284e.

Stored in the volume characteristic 284f are volume characteristic values indicating whether a virtual volume corresponding to the record can be allocated to the host computer 100. The volume characteristic values include "end" indicating that a virtual volume corresponding to the record can be allocated to the host computer 100 and "internal" indicating that a virtual volume corresponding to the record is internally used at the storage apparatuses 200 and thus cannot be allocated to the host computer 100. For example, when a virtual volume corresponding to the record is a virtual volume constituting a virtual pool, the volume characteristic value is "internal". Meanwhile, when a virtual volume corresponding to the record is a virtual volume cut out from a virtual pool or cut out form a virtual parity group and not internally used at the storage apparatuses 200, the volume characteristic value is "end".

Stored in the usability 284g is information indicating whether a virtual volume corresponding to the record can be used. For example, when the host computer 100 already uses the virtual volume corresponding to the record or when the virtual volume corresponding to the record is an internal volume constituting a virtual pool, the value "used" indicative of non-usability is stored in the usability 284g. In other cases, the value "unused" indicative of usability is stored in the usability 284g. Stored in the physical storage identifier 284h are physical storage identifiers for the physical storage apparatuses 200 having physical volumes allocated to virtual volumes corresponding to the record. Stored in the physical volume identifier 284i are physical volume identifiers for the physical volumes allocated to the virtual volumes corresponding to the record.

According to the virtual volume information 284, it is possible to specify to which of the physical volumes the virtual volumes correspond from combinations of the physical storage identifiers and the physical pool identifiers.

FIG. 9A is a configuration diagram of one example of physical parity group information in the storage apparatus according to the embodiment. FIG. 9B is a configuration diagram of another example of physical parity group information in the storage apparatus according to the embodiment. The physical parity group information illustrated in FIG. 9A indicates the physical parity group information stored in the physical storage 1 illustrated in FIG. 2, and the physical parity group information illustrated in FIG. 9B indicates the physical parity group information stored in the physical storage 2 illustrated in FIG. 2.

The physical parity group information 291 is configured in a table form, for example, to store records including fields for physical storage identifier 291a, physical parity group identifier 291b, capacity 291c, and type 291d.

Stored in the physical storage identifier 291a are identifiers for uniquely identifying the physical storage apparatuses 200 having the physical parity groups corresponding to the record in a storage network (physical storage identifiers). Stored in the physical parity group identifier 291b are identifiers for uniquely identifying the physical parity groups corresponding to the record in the physical storage apparatuses 200 (physical parity group identifiers). Stored in the capacity 291c are the capacities of the physical parity groups corresponding to the record. Stored in the type 291d is information indicative of types of the physical devices constituting the physical parity groups corresponding to the record. The types of the physical devices include "SSD", "SAS", "SATA", and the like.

For example, according to the physical parity group information 291 illustrated in FIG. 9A, the physical parity group 1 in the physical storage 1 has a capacity of 60 GB and a physical device of SSD. In addition, according to the physical parity group information 291 illustrated in FIG. 9B, the physical parity group 2 in the physical storage 2 has a capacity of 60 GB and a physical device of SATA.

FIG. 9C is a configuration diagram of physical pool information in the storage apparatus according to the embodiment. The physical pool information illustrated in FIG. 9C indicates the physical pool information stored in the physical storage 1 illustrated in FIG. 2.

The physical pool information 292 is configured in a table form, for example, to store records including fields for physical storage identifier 292a, physical pool identifier 292b, and capacity 292c.

Stored in the physical storage identifier 292a are physical storage identifiers for the physical storage apparatuses 200 having physical pools corresponding to the record. Stored in the physical pool identifier 292b are identifiers for uniquely identifying the physical pools corresponding to the record in the storage apparatuses 200 (physical pool identifiers). Stored in the capacity 292c are the capacities of the physical pools corresponding to the record.

FIG. 9D is a configuration diagram of one example of physical volume information in the storage apparatus according to the embodiment. FIG. 9E is a configuration diagram of another example of physical volume information in the storage apparatus according to the embodiment. The physical volume information illustrated in FIG. 9D indicates the physical volume information stored in the physical storage 1 illustrated in FIG. 2, and the physical volume information illustrated in FIG. 9E indicates the physical volume information stored in the physical storage 2 illustrated in FIG. 2.

The physical volume information 293 is configured in a table form, for example, to, each of the physical volumes in the physical storage apparatus 200 to which the physical volume information 293 belongs, store records including fields for physical storage identifier 293a, physical volume identifier 293b, user identifier 293c, physical pool identifier 293d, physical parity group identifier 293e, volume characteristic 293f, usability 293g, and capacity 293h.

Stored in the physical storage identifier 293a are physical storage identifiers for uniquely identifying the physical storage apparatuses 200 having physical volumes corresponding to the record. Stored in the physical volume identifier 293b are identifiers for uniquely identifying the physical volumes corresponding to the record in the physical storage apparatuses 200 (physical volume identifiers). Stored in the user identifier 293c are identifiers for identifying the users of the physical volumes in the same record (user identifiers). For example, as for a physical volume used by the host computer 100, stored in the user identifier 293c is the identifier for uniquely identifying the host computer 100 (host computer identifier). In addition, as for a physical volume used by a physical pool, that is, a physical volume constituting a physical pool (called internal physical volume), the physical pool identifier for the physical pool is stored. Stored in the physical pool identifier 293d are physical pool identifiers for the physical pools obtained by cutting out the physical volumes corresponding to the record. When the physical volume corresponding to the record is not a physical volume cut out from the physical pool, the mark "−" indicative of invalid value is stored in the physical pool identifier 293d. Stored in the physical parity group identifier 293e are physical parity group identifiers for the physical parity groups obtained by cutting out the physical volumes corresponding to the record. When the physical volume corresponding to the record is not directly cut out from the physical parity group, for example, when the physical volume is cut out form the physical pool, the mark "−" indicative of invalid value is stored in the physical parity group identifier 293e.

Stored in the volume characteristic 293f are volume characteristic values indicating whether a physical volume corresponding to the record can be allocated to the host computer 100. The volume characteristic values include "end" indicating that the physical volume corresponding to the record can be allocated to the host computer 100 and "internal" indicating that the physical volume corresponding to the record is internally used at the storage apparatuses 200 and thus cannot be allocated to the host computer 100. For example, when the physical volume corresponding to the record is a physical volume constituting a physical pool, the volume characteristic value is "internal". Meanwhile, when the physical volume corresponding to the record is a physical volume cut out from a physical pool, or cut out form a physical parity group and not internally used at the storage apparatuses 200, the volume characteristic value is "end".

Stored in the usability 293g is information indicating whether a physical volume corresponding to the record can be used. For example, when the host computer 100 already uses the physical volume corresponding to the record or when the physical volume corresponding to the record is an internal volume constituting a physical pool, the value "used" indicative of non-usability is stored in the usability 293g. In other cases, the value "unused" indicative of usability is stored in the usability 293g. Stored in the capacity 293h are the capacities of the physical volume corresponding to the record.

FIG. 10A is a configuration diagram of a volume reservation table in the storage management server according to the embodiment.

The volume reservation table 343 is management information on which of the host computers 100 has reserved which of the virtual volumes for use. The reservation of the virtual volumes for use does not depend on the used or unused state of the virtual volumes in the storage apparatuses 200. The volume reservation table 343 stores records including fields for virtual storage identifier 343a, virtual volume identifier 343b, and host identifier 343c.

Stored in the virtual storage identifier 343a are virtual storage identifiers for virtual storage apparatuses having virtual volumes to be reserved. Stored in the virtual volume identifier 343b are virtual volume identifiers for the virtual volumes to be reserved. Stored in the host identifier 343c are the host identifiers for the host computers 100 using the virtual volumes to be reserved.

The information in the volume reservation table 343 can be set by the storage management server 300 displaying a reservation screen (not illustrated) on the monitor 370 to reserve which of the virtual volumes to be used by which of the host computers 100, and accepting the contents of the reservation from the administrator via the input apparatus 380, for example.

FIG. 10B is a configuration diagram of a screen table in the storage management server according to the embodiment.

The screen table 338 is information for managing correspondences between screens used by the configuration information acquisition program 334 and information search conditions of information necessary for display on the screens. In the embodiment, the screen table 338 is static information held by the configuration information acquisition program 334. However, the present invention is not limited to this, but the screen table 338 may be stored in the disk device 340 such that the administrator can edit the contents of the screen table 338.

The screen table 338 stores records including fields for screen identifier 338a, resource identifier 338b, search condition 338c, search starting point 338d, and management server information name 338e.

Stored in the screen identifier 338a are identifiers for uniquely identifying the types of the screens provided by the storage management server 300 (screen identifiers). Stored in the resource identifier 338b are resource identifier names noticed on the screens corresponding to the screen identifiers (for example, names used as filed name in the record). Stored in the search condition 338c are search formulae for search conditions to be included in a search request to be transmitted to the storage apparatuses 200 to search for the configuration information on the resource corresponding to the resource identifier name noticed on the screen identified by the screen identifier corresponding to the record. The search formulae may include the substitution symbol "?" indicating of a value requiring substitution, for example. When any of the search formulae includes the substitution symbol "?", the storage management server 300 refers to the management server information in the management server information name 338e to solve the value of the substitution symbol "?". Details of this matter will be described later. Stored in the search starting point 338d are the values of search starting points included in search requests. The search starting points are information names from which searches are started. Stored in the management server information name 338e are information names in the management server information 342 to be used for solving the value of the substitution symbol "?" when the substitution symbol "?" is included in the record search condition 338c.

FIG. 11A is a configuration diagram of virtual storage information in the storage management server according to the embodiment.

The virtual storage information 351 stores records including fields for virtual storage identifier 351a and physical storage identifier 351b. The contents of the fields are the same as those of the fields with the same names in the virtual storage information 281 illustrated in FIG. 8A.

FIG. 11B is a configuration diagram of virtual parity group information in the storage management server according to the embodiment.

The virtual parity group information 352 stores records including fields (352a to 352d) similar to those of the virtual parity group information 282 illustrated in FIG. 8B and a last update time 352e. Stored in the last update time 352e is a time of record update (update time).

FIG. 11C is a configuration diagram of virtual pool information in the storage management server according to the embodiment.

The virtual pool information 353 stores records including fields (353a to 353d) similar to those of the virtual pool information 283 illustrated in FIG. 8C and a last update time 353e. Stored in the last update time 353e is a time of record update (update time).

FIG. 11D is a configuration diagram of virtual volume information in the storage management server according to the embodiment.

The virtual volume information 354 stores records including fields (354a to 354i) similar to those of the virtual volume information 284 illustrated in FIG. 8D and a last update time 354j. Stored in the last update time 354j is a time of record update (update time).

FIG. 12A is a configuration diagram of physical parity group information in the storage management server according to the embodiment.

The physical parity group information 361 stores records including fields (361a to 361d) similar to those of the physical parity group information 291 illustrated in FIG. 9A and a last update time 361e. Stored in the last update time 361e is a time of record update (update time). The physical parity group information 361 is an aggregation of the physical parity group information 291 in the plurality of storage apparatuses 200.

FIG. 12B is a configuration diagram of physical pool information in the storage management server according to the embodiment.

The physical pool information 362 stores records including fields (362a to 362c) similar to those of the physical pool information 292 illustrated in FIG. 9C and a last update time 362d. Stored in the last update time 362d is a time of record update (update time). The physical pool information 362 is an aggregation of the physical pool information 292 in the plurality of storage apparatuses 200.

FIG. 12C is a configuration diagram of physical volume information in the storage management server according to the embodiment.

The physical volume information 363 stores records including fields (363a to 363h) similar to those of the physical volume information 293 illustrated in FIG. 9D and a last update time 363i. Stored in the last update time 363i is a time of record update (update time). The physical volume information 363 is an aggregation of the physical volume information 293 in the plurality of storage apparatuses 200.

Next, processes performed in the storage system according to the embodiment will be described. First, a process performed by the storage apparatus 200 will be described.

Figure 13:
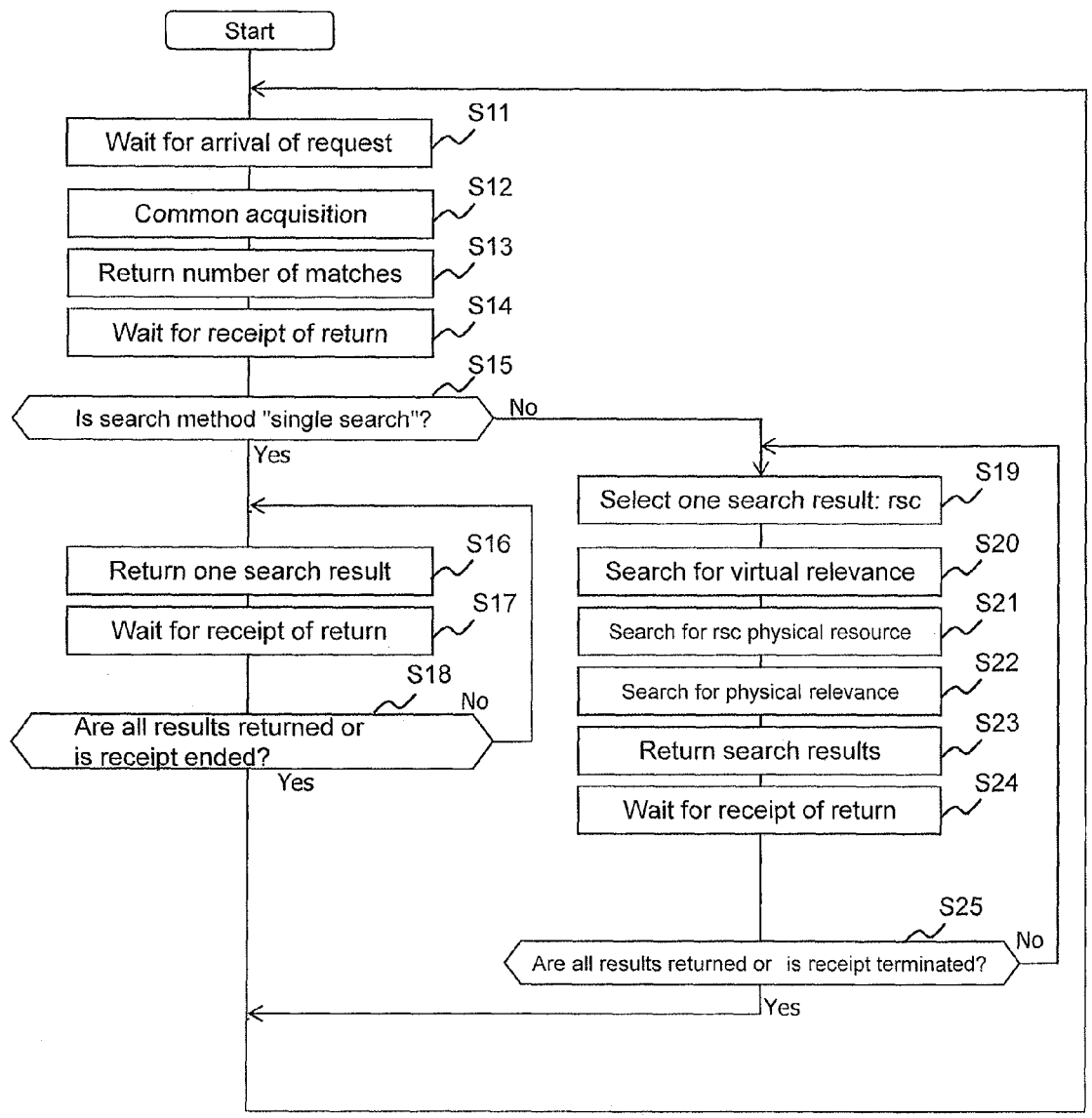
FIG. 13 is a flowchart of a configuration information search process according to the embodiment.

FIG. 13 is a flowchart of a configuration information search process according to the embodiment.

The configuration information search process is performed by the controller 210 executing the configuration information search program 262 in the storage apparatuses 200 to search the configuration management information 271 in the storage apparatuses 200 and return the search result to the storage management server 300. Flexible search is carried out according to a search request issued from the storage management server 300.

The configuration information search program 262 waits for arrival of a search request at the storage apparatus 200 (step S11). The search request includes a search method, a search starting point, and a search condition. The search method has either the value "single search" or "relevance tracking". The "single search" is a value set at transverse acquisition and indicates that a search is conducted only for information at the search starting point included in the search request. The "relevance tracking" is a value set at longitudinal acquisition and indicates that a search is conducted tracking relevant information from the information at the search starting point. The search starting point is an information name (table name) at which a search is started. The search condition is a search formula expressed by a combination of column name, operator, and value. When a specific value ("none") is set to the search condition, the configuration information search program 262 determines that all of the records are matched without any condition.

After that, upon arrival of the search request, the configuration information search program 262 executes a common search for searching the configuration management information 271 according to the search request (step S12). At the common search, the configuration information search program 262 searches only for information at the search starting point included in the search request.

Taking an example in which the contents of the virtual volume information 284 in the configuration management information 271 are illustrated in FIG. 8D, the search starting point in the search request is "virtual volume information", and the search conditions are "virtual storage identifier=virtual storage 1" and "volume characteristic=end" (called example 1), the configuration information search program 262 searches the virtual volume information 284 (refer to FIG. 8D), and acquires six search results (six records) indicating that the virtual volume identifiers 284b are "virtual volumes 3, 4, 5, 6, 7, and 8" as records in which the virtual storage identifier 284a is "virtual storage 1" and the volume characteristic 284f is "end".

Next, the configuration information search program 262 returns the number of items (number of records) matching the search conditions at the search of step S12 to the storage management server 300 as a search request source (step S13). In the example 1, the configuration information search program 262 returns "6" as the number of matched items to the search request source (storage management server 300).

Then, the configuration information search program 262 waits for return of a reply indicating receipt of the number of matched items from the search request source (step S14).

After that, when a reply indicating receipt of the number of matched items is returned from the search request source, the configuration information search program 262 determines whether the search method in the search request is "single search" (step S15).

As a result, when the search method is "single search" (step S15: Yes), the configuration information search program 262 selects one record from the search result acquired at step S12, and returns the same to the search request source (step S16). At that time, the configuration information search program 262 returns a set of the table name as a target of the search (target table name) and the value of the record obtained at the search. In the example 1, at the process in step S16 for the first time, the configuration information search program 262 returns a set of the target table name=virtual volume information and the record value=the value of the record related to the virtual volume 3 in the virtual volume information 284. In addition, at the process in step S16 for the second time after the subsequent step S18, the configuration information search program 262 returns the value of the record related to the virtual volume 4. At the process in step S16 for the third time after the subsequent step S18, the configuration information search program 262 returns the value of the record related to the virtual volume 5.

As described above, in the embodiment, when a large number of records are acquired as search results, the records are returned one by one to prevent a large number of data from being returned at one time to the search request source. Accordingly, in the case of cancelling the process corresponding to the search request and performing a process corresponding to another search request or the like, it is possible to quickly switch the processes at the storage apparatus 200 and the storage management server 300.

In the embodiment, the search results are returned by one record. However, the present invention is not limited to this and, when there exist a large number of records as search results, the search results can be divided and returned by predetermined division unit to the search request source. For example, the search results can be returned by a plurality of records. In this case, the division unit may be the number of records capable of being stored in data communication unit (communication packet), for example.

Then, the configuration information search program 262 waits for return of a reply indicating completion of receipt of one record from the search request source (step S17). Then, on receipt of the reply from the search request source, the configuration information search program 262 determines whether all of the search results have been returned or whether the search request source has stopped receipt of the search results (for example, a reply indicating stoppage of the receipt has been received from the search request source or no reply has been returned from the search request source for a specific period of time) (step S18). As a result, when all of the search results have been returned or the search request source has stopped receipt of the search results (step S18: Yes), the configuration information search program 262 moves the process to step S11 to wait for a next search request. On the other hand, when all of the search results have not been returned and the search request source has not stopped receipt of the search results (step S18: No), the configuration information search program 262 moves the process to step S16 to transmit the remaining records in the search results.

Meanwhile, when determining at step S15 that the search method is not "single search", that is, the search method is "relevance tracking" (step S15: No), the configuration information search program 262 selects one record from the search results acquired at step S12 and stores the same in variable rsc (step S19). In the example 1, the configuration information search program 262 selects one of the records in which the virtual volume identifiers 284b in the virtual volume information 284 are "virtual volumes 3, 4, 5, 6, 7, and 8".

Next, the configuration information search program 262 conducts virtual relevant search to acquire configuration information on other virtual resources in the virtual storage apparatus related to the virtual resource stored in the variable rsc (step S20). In the following description, the variable rsc is a record targeting at virtual volumes. However, even when the variable rsc is a record targeting at other virtual resources, a similar search is conducted tracking the configuration information on relevant resources in the virtual storage apparatus. The resource targeted by the variable rsc can be known from the table name corresponding to the record of the variable rsc.

Case 1: when a valid value is stored in the virtual pool identifier 284d of the record of the variable rsc (here corresponding to the record of the virtual volume information 284) (that is, the virtual volume is cut out from the virtual pool), the configuration information search program 262 tracks, from the virtual volume of the record indicated by the variable rsc (end virtual volume), the relevant resources such as (1) relevant virtual pools, (2) internal virtual volumes, and (3) virtual parity groups, and then acquires the configuration information on the resources. Specifically, the configuration information search program 262 performs the process described below.

(1) The configuration information search program 262 searches for the configuration information on the virtual pools related to the virtual volume corresponding to the variable rsc. Specifically, the configuration information search program 262 searches the virtual pool information 283 for records in which the virtual pool identifier of the virtual pool identifier 283b is the same as the virtual pool identifier of the virtual pool identifier 284d in the record of the variable rsc. Here, the group of records as search results will be referred to as "pool".

(2) Next, the configuration information search program 262 searches for the configuration information on the virtual volumes (internal virtual volumes) related to "pool". Specifically, the configuration information search program 262 searches the virtual volume information 284 for records in which the user identifier of the user identifier 284c matches the virtual pool identifier of the virtual pool identifier 283b in "pool". Here, the group of records as search results will be referred to as "pool-vol group".

(3) Finally, the configuration information search program 262 searches for the configuration information on the virtual parity groups related to the "pool-vol group". Specifically, the configuration information search program 262 searches the virtual parity group information 282 for records in which the virtual parity group identifier of the virtual parity group identifier 282b is the same as the virtual parity group identifier of the virtual parity group identifier 284e in the "pool-vol group". Here, the group of records as search results is referred to as "v-pg group".

More specifically, applicable as candidates for the variable rsc in the case 1 are records in which the virtual volume identifier 284b is "virtual volume 3" or "virtual volume 4" in the virtual volume information 284 illustrated in FIG. 8D. In the following process, the record with the "virtual volume 3" is selected as variable rsc.

In the "pool" as a group of records of virtual pools related to the virtual volume 3 indicated by the variable rsc, the virtual pool identifier 283b of the virtual pool information 283 is the record with the virtual pool 1. In the "pool-vol group" as a group of records of the virtual volumes related to the virtual pool 1 indicated by the "pool", the virtual volume identifier 284b of the virtual volume information 284 is the record with the "virtual volume 1" or "virtual volume 2". In the "v-pg group" as a group of records of virtual parity groups related to the virtual volume 1 or 2 indicated by the "pool-vol group", the virtual parity group identifier 282b of the virtual parity group information 282 is the record with the "virtual parity group 1".

Case 2: When a valid value is stored in the virtual parity group identifier 284e of the record of the variable rsc (that is, the virtual volume is cutout from the virtual parity group), the configuration information search program 262 tracks, from the virtual volume indicated by the variable rsc, (4) relevant virtual parity groups, and acquires the configuration information on the resources. Specifically, the configuration information search program 262 performs the process described below.

(4) The configuration information search program 262 searches for the configuration information on virtual parity groups related to the virtual volume indicated by the rsc. Specifically, the configuration information search program 262 searches the virtual parity group information 282 for records in which the virtual parity group identifier of the virtual parity group identifier 282b is the same as the virtual parity group identifier of the virtual parity group identifier 284e of the variable rsc. Here, a group of records as search results will be referred to as "v-pg group".

More specifically, applicable as candidates for the variable rsc in the case 2 are the records in which the virtual volume identifier 284b is the "virtual volume 5", "virtual volume 6", "virtual volume 7", or "virtual volume 8" in the virtual volume information 284 illustrated in FIG. 8D. In the following process, the record of the "virtual volume 6" is selected as the variable rsc.

The "v-pg group" as a group of records of the virtual parity groups related to the virtual volume 6 indicated by the variable rsc is a record in which the virtual parity group identifier 282b of the virtual parity group information 282 is the "virtual parity group 2".

Next, the configuration information search program 262 searches for physical resources related to the virtual resources stored in the variable rsc (step S21). Specifically, the configuration information search program 262 acquires the physical storage identifiers and the physical volume identifiers corresponding to the virtual volumes stored in the variable rsc.

For example, when the physical storage identifier indicates the subject storage apparatus 200 executing the configuration information search process, the configuration information search program 262 searches the physical configuration management information 290 in the configuration storage device 270 of the subject storage apparatus 200 to acquire a record in which the physical volume identifier of the physical volume identifier 293b in the physical volume information 293 is the same as the physical volume identifier of the physical volume identifier 284i of the variable rsc, and sets the record to new variable rsc. For example, when the virtual resource stored in the variable rsc is "virtual volume 3", the physical storage identifier 284h is "physical storage 1", and the physical volume identifier 284i is "physical volume 3". In addition, when the physical storage 1 executes the configuration information search process, the configuration information search program 262 acquires the record in which the physical volume identifier 293b is "physical volume 3" from the physical volume information 293 in the storage apparatus 200, and sets the record to new variable rsc.

On the other hand, when the physical storage identifier does not indicate the subject storage apparatus 200 executing the configuration information search process, the configuration information search program 262 issues a search request via the communication network 20 to another storage apparatus 200 having a physical storage identifier, receives search results, and sets the received record to new variable rsc. At that time, the search method in the search request is "single search", the search starting point is "physical volume information", and the search condition is physical volume identifier=physical volume identifier of variable rsc. For example, when the virtual resource stored in the variable rsc is "virtual volume 6", the physical storage identifier 284h is "physical storage 2", and the physical volume identifier 284i is "physical storage 2". In addition, when the physical storage 1 performs the configuration information search process, the configuration information search program 262 issues a search request to the storage apparatus 200 indicated by the physical storage 2 of the physical storage identifier 284h of the variable rsc, acquires the record in which the physical volume identifier 293b of the physical volume information 293 in the storage apparatus 200 of the physical storage 2 is the "physical volume 2", and then sets the record to new variable rsc.

Next, the configuration information search program 262 conducts physical relevant search to acquire configuration information on other physical resources in the storage apparatus related to the physical resources indicated by the variable rsc (step S22). At this step, the search process for tracking the relevant virtual resources from the virtual volume performed at the virtual relevant search at step S20 is replaced with the search process for tracking the relevant physical resources from the physical volume, and the information to be referred to is replaced with the configuration information on the physical resources. The nature of the process is similar to that of virtual relevant search.

When the physical storage identifier 293b of the record of the variable rsc (here corresponding to the record of the physical volume information 293) is not the physical storage identifier of the storage apparatus 200 executing the configuration information search process, the configuration information search program 262 issues a search request via the communication network 20 to the storage apparatuses 200 with the physical storage identifier of the physical storage identifier 293b, and receives search results.

On the other hand, when the physical storage identifier 293b of the record of the variable rsc is the physical storage identifier of the storage apparatuses 200 executing the configuration information search process, the configuration information search program 262 performs the following process.

Case 3: When a valid value is stored in the physical pool identifier 293d of the variable rsc (that is, the physical volume is cut out from the physical pool), the configuration information search program 262 tracks, from the physical volume of the record indicated by the variable rsc (end physical volume), relevant resources such as (1) relevant physical pools, (2) internal physical volumes, and (3) physical parity groups, and acquires the configuration information on the resources.

Case 4: When a valid value is stored in the physical parity group identifier 293e of the variable rsc (that is, the physical volume is cut out from the physical parity group), the configuration information search program 262 tracks, form the physical volume indicated by the variable rsc, (4) the physical parity groups, and acquires the configuration information on the resources.

Then, the configuration information search program 262 returns all of the records of the virtual resources and the physical resources relevant to the variable rsc obtained by the searches to the search request source (step S23). At that time, the configuration information search program 262 returns an array of table names corresponding to the records (target table names) and sets of values of records.

For example, when the record with "virtual volume 3" is stored in the variable rsc at step S19, the configuration information search program 262 returns at step S23 all of the following information items (1) to (6):
(1) "Target table name=virtual volume information" and "record values=records on virtual volumes 1, 2, and 3"
(2) "Target table name=virtual pool" and "record values=records on virtual pool 1"
(3) "Target table name=virtual parity group information" and "record values=records on virtual parity group 1"
(4) "Target table name=physical volume information" and "record values=records on physical volumes 1, 2, and 3"
(5) "Target table name=physical pool" and "record values=records on physical pool 1"
(6) "Target table name=physical parity group information" and "record values=records on physical parity group 1"

Meanwhile, when the record with "virtual volume 6" is stored in the variable rsc at step S19 (corresponding to the step illustrated in FIG. 4 (1)), the configuration information search program 262 returns at step S23 all of the following information items (1) to (4):
(1) "Target table name=virtual volume information" and "record values=records on virtual volume 6"
(2) "Target table name=virtual parity group information" and "record values=records on virtual parity group 2"
(3) "Target table name=physical volume information" and "record values=records on physical volume 2"
(4) "Target table name=physical parity group information" and "record values=records on physical parity group 1"

Then, the configuration information search program 262 waits for return of a reply indicating receipt of the search results from the search request source (step S24). Then, upon receipt of a reply from the search request source, the configuration information search program 262 determines whether all of the search results have been returned, or whether the search request source has stopped receipt of the search results (for example, a reply indicating cancellation of receipt has been received from the search request source or no replay has been returned from the search request source for a certain period of time) (step S25). As a result, when all of the search results have been returned or the search request source has cancelled receipt of the search results (step S25: Yes), the configuration information search program 262 moves the process to step S11 to wait for arrival of a next search request. Meanwhile, when all of the search results have not been returned or the search request source has not cancelled receipt of the search results (step S25: No), the configuration information search program 262 moves the process to step S19 to process the remaining records in the search results obtained at step S12 as variable rsc in the same manner.

Figure 14:
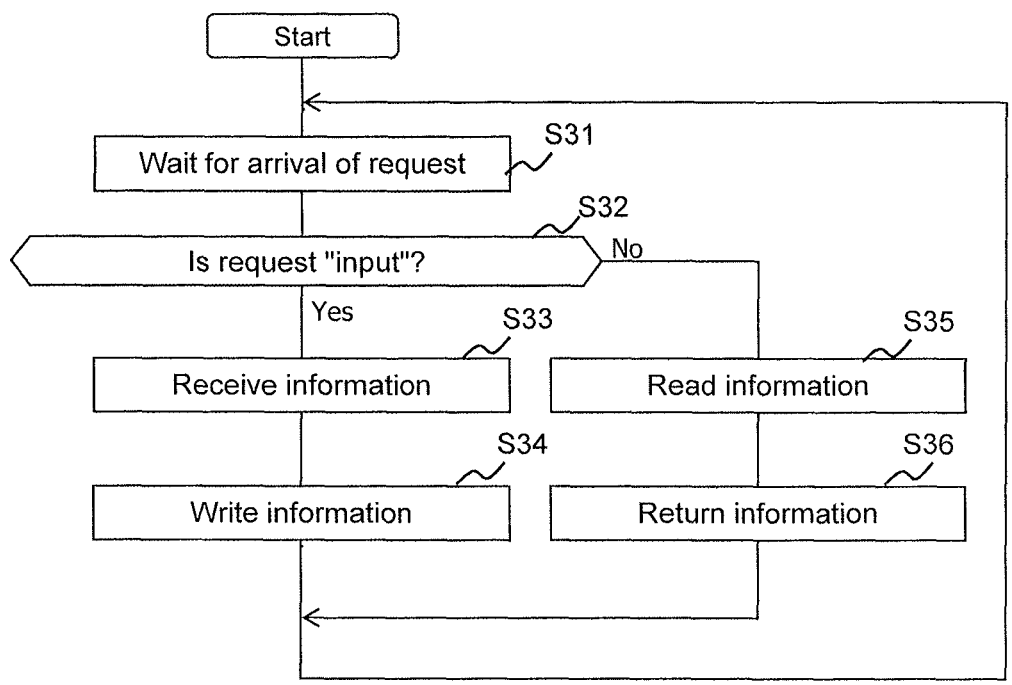
FIG. 14 is a flowchart of a management server information input/output process according to the embodiment.

FIG. 14 is a flowchart of a management server information input/output process according to the embodiment.

The management server information input/output process is performed by the storage apparatus 200 under indications from the storage management server 300 through the communication network 20. Specifically, the management server information input/output process is performed by the controller 210 executing the management server information input/output program 263 in the storage apparatus 200. The management server information input/output process is intended to save information desired by the storage management server 300 in the configuration storage device 270 of the storage apparatus 200 or read information from the configuration storage device 270.

The management server information input/output program 263 waits for arrival of an input/output request for the management server information from the storage management server 300 (step S31). The input/output request here includes input/output type. The input/output type takes the value of either "input" for saving information to the configuration storage device 270 or "output" for reading information from the configuration storage device 270.

Upon arrival of the input/output request of the management server information from the storage management server 300, the management server information input/output program 263 determines whether the input type of the input/output request is "input" (step S32).

As a result, when the input/output type in the input/output request is "input" (step S32: Yes), the management server information input/output program 263 receives information to be input from the storage management server 300 (step S33), saves the received information in the management server information 272 of the configuration storage device 270 (step S34), and moves the process to step S31.

Meanwhile, the input/output type of the input/output request is "output" (step S32: No), the management server information input/output program 263 reads the management server information 272 of the configuration storage device 270 (step S35), returns the read information to the storage apparatuses 200 (step S36), and moves the process to step S31.

Next, processes performed by the storage management server 300 will be described.

First, a GUI input/output process by the GUI input/output program 331 will be described.

In the GUI input/output process, the GUI input/output program 331 displays a GUI screen (refer to FIGS. 6 and 7) on the monitor 370, receives an operation from the administrator via the input apparatus 380, and switches screens in an interactive manner. A specific process will be described below.

The GUI input/output program 331 draws trees in the tree display area 1100 on the GUI screen 1000. Specifically, the GUI input/output program 331 displays trees having as nodes the typical resource names of the storage apparatuses 200 and the host computers 100. At that time, the GUI input/output program 331 renders a tree of nodes related to the storage apparatuses 200 using the virtual storage information 351 of the storage management server 300, and draws a tree of nodes related to the host computers 100 using the values of the user identifier 354c of the virtual volume information 354.

Next, the GUI input/output program 331 waits for receipt of an operation by the administrator on the screen via the input apparatus 380.

Then, upon receipt of the operation by the administrator on the screen via the input apparatus 380, the GUI input/output program 331 determines which of the nodes is selected by the user, and stores in the main memory 330 a set of a screen identifier and a resource identifier (indicating to which of the resources the information is tied) associated in advance with the selected node. For example, when the administrator selects the child node "pool" of the "virtual storage 1", the GUI input/output program 331 stores "virtual storage pool" as the value of 338a for the screen identifier, and stores "virtual storage 1" as virtual storage identifier for the resource identifier.

Next, the GUI input/output program 331 renders information on the node selected by the administrator in a table form in the table display area 1210 of the GUI screen 1000. At that time, the GUI input/output program 331 renders the table in which the configuration management information 341 is appropriately combined. When some of the required items do not exist in the configuration management information 341, the items are not displayed.

Figure 15B:
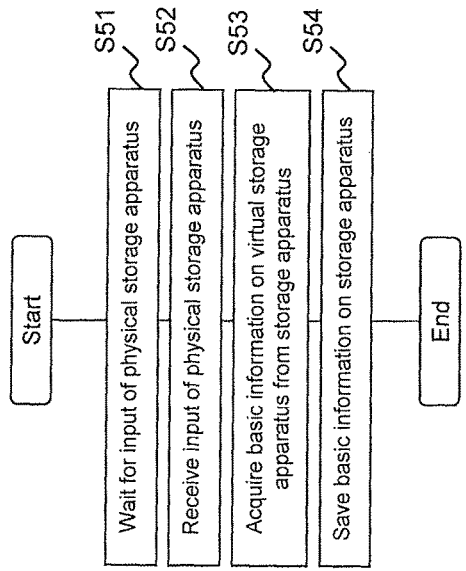
FIG. 15B is a flowchart of a storage registration process according to the embodiment.
Figure 15A:
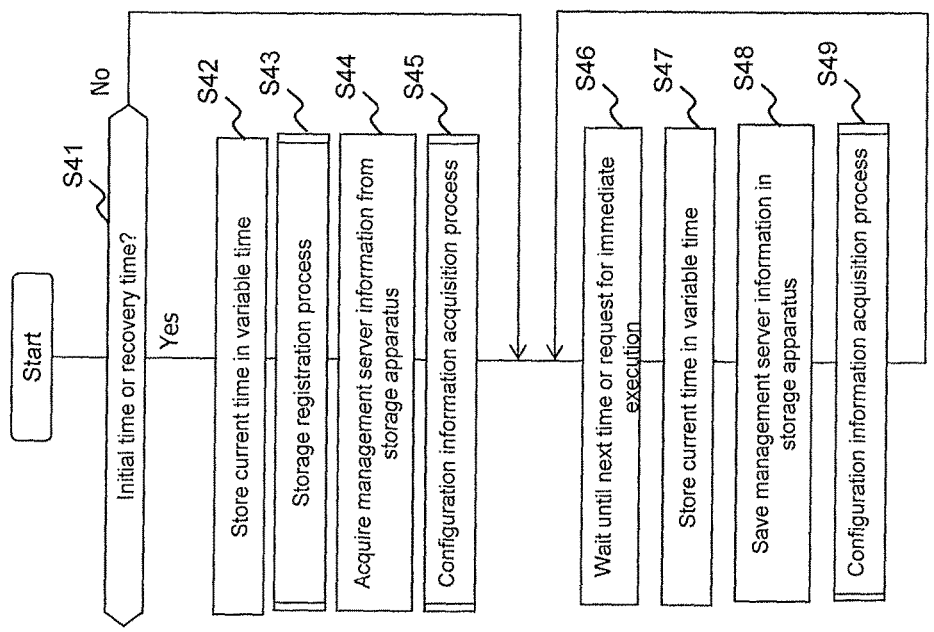
FIG. 15A is a flowchart of a synchronization process according to the embodiment.

FIG. 15A is a flowchart of a synchronization process according to the embodiment.

The synchronization process is a resident process that is started by the controller 310 executing the synchronization program 332 at activation of the storage management server 300, and after that, is performed on a steady basis. To recover the storage management server 300, the execution of the synchronization process is started again.

The synchronization program 332 determines whether this is an initial activation time or a recovery time (step S41). In the embodiment, the synchronization program 332 determines whether there exists any record in the virtual storage information 351, and when there is no record, the synchronization program 332 determines that this is "an initial starting or recovery time".

As a result, when this is an initial activation time or a recovery time (step S41: Yes), the synchronization program 332 stores the current time point as variable time point (step S42). The time stored in the variable time here indicates the time point when the synchronization process was started.

Then, the synchronization program 332 invokes the storage registration program 333 to execute a storage registration process (refer to FIG. 15B). In the storage registration process, the physical storage identifiers of the storage apparatuses 200 to be managed by the storage management server 300 are registered by the administrator.

Then, the synchronization program 332 acquires the management server information 272 evacuated to the storage apparatuses 200 from the storage apparatuses 200 (step S44). Specifically, the synchronization program 332 issues an input/output request for management server information with the input/output type of "output" via the communication network 20 to all of the physical storage apparatuses 200 corresponding to the physical storage identifiers in the physical storage identifier 351b of the virtual storage information 351, acquires the management server information 272 stored from the storage apparatuses 200, and saves the acquired management server information 272 in the management server information 342 in the disk device 341. By this process, it is possible to, at occurrence of a failure or the like, appropriately recover the previously used management server information in the storage management server 300.

Then, the synchronization program 332 invokes the configuration information acquisition program 334 to execute the configuration information acquisition process (refer to FIG. 16A) (step S45). By the configuration information acquisition process, it is possible to update the configuration management information 341 in the storage management server 300 to the latest one.

Then, the synchronization program 332 waits for a lapse of a certain time (for example, one day). When receiving an instant execution request for the configuration information acquisition process during the waiting time from the administrator via the input apparatus 380, the synchronization program 332 stops waiting and moves instantly the process to step S47.

At step S47, the synchronization program 332 stores the current time point in variable time. The synchronization program 332 then transmits the management server information 342 in the disk device 340 to the storage apparatuses 200 to store the management server information 342 in the configuration storage devices 270 of the storage apparatuses 200 (step S48). Specifically, the synchronization program 332 issues an input/output request for management server information with the input/output type of "input" via the communication network 20 to all of the physical storage apparatuses 200 corresponding to the physical storage identifiers in the physical storage identifier 351b in the virtual storage information 351, and transmits the management server information 342 to the storage apparatuses 200. At each of the physical storage apparatuses 200, the management server information input/output process (refer to FIG. 14) is executed to save the transmitted information in the configuration storage devices 270. Accordingly, it is possible to appropriately evacuate the management server information 342 from the storage management server 300 to the storage apparatuses 200.

Then, the synchronization program 332 invokes the configuration information acquisition program 334 to execute the configuration information acquisition process (refer to FIG. 16A) (step S49). By the configuration information acquisition process, it is possible to update the configuration management information 341 in the storage management server 300 to the latest one. After that, the synchronization program 332 moves the process to step S46.

FIG. 15B is a flowchart of a storage registration process according to the embodiment.

The storage registration process is performed at step S43 of the synchronization process at initial activation of the storage management server 300 or recovery of the same from a failure. The storage registration process is performed by the controller 310 executing the storage registration program 333 to receive and register the physical storage identifier of the physical storage apparatus 200 to be managed by the storage management server 300 from the administrator, and acquire the virtual storage identifier of the virtual storage apparatus related to the physical storage apparatus 200.

The storage registration program 333 waits until the physical storage identifier (one example of basic information) of the physical storage apparatus to be managed, is input by the administrator via the input apparatus 380 on the GUI screen rendered by the GUI input/output program 331 (step S51). The administrator may input the physical storage identifiers of a plurality of physical storage apparatuses to be managed at the same instant on the GUI screen.

Then, when the physical storage identifier of the physical storage apparatus 200 to be managed is input by the administrator via the input apparatus 380, the storage registration program 333 receives the physical storage identifier input by the administrator (step S52).

Then, the storage registration program 333 acquires the basic information on the virtual storage apparatus 400 (for example, virtual storage identifier) from the storage apparatuses 200 (step S53). The virtual storage identifier may be, for example, an IP address or an MAC address of the virtual storage apparatus. The storage registration program 333 requests the virtual storage identifiers of the virtual storage apparatus from all of the storage apparatuses 200 corresponding to the physical storage identifier. More specifically, the storage registration program 333 issues a search request in which the search method is "single search", the search starting point is "virtual storage information", and the search condition is "physical storage identifier=physical storage identifier acquired at step S52" to the storage apparatuses 200 via the communication network 20, and receives records (sets of virtual storage identifier and physical storage identifiers) meeting the search condition in the search request from the storage apparatuses 200.

The storage registration program 333 saves the basic information on the virtual storage apparatus (the sets of virtual storage identifier and physical storage identifiers in the embodiment) acquired at step S53 in the virtual storage information 351.

Figure 16B:
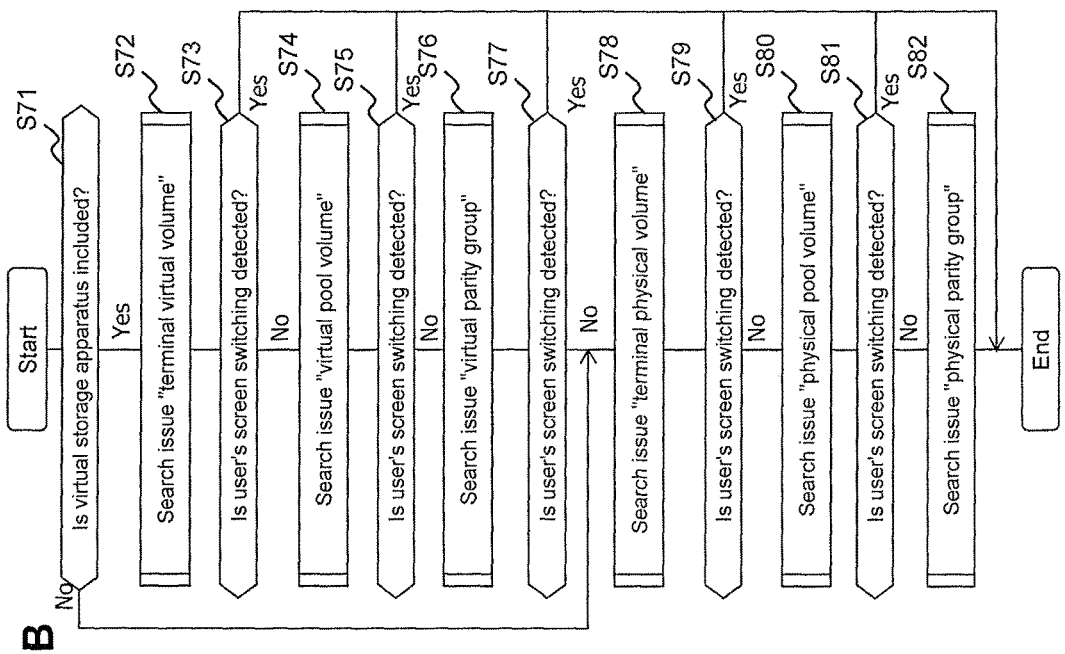
FIG. 16B is a flowchart of a transverse acquisition process according to the embodiment.
Figure 16A:
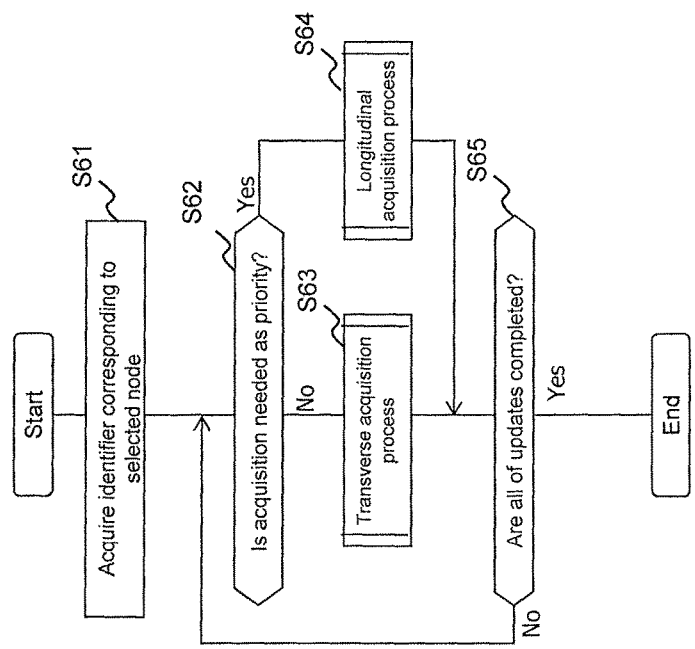
FIG. 16A is a flowchart of a configuration information acquisition process according to the embodiment.

FIG. 16A is a flowchart of a configuration information acquisition process according to the embodiment.

The configuration information acquisition process is intended to collect the configuration management information 341 from a plurality of storage apparatuses 200 to allow the storage management server 300 to uniformly manage the configuration information on the storage system. Since it takes a long time to complete the configuration information acquisition process, the embodiment realizes the efficient acquisition of the configuration information on the storage system from the viewpoint of the administrator. Specifically, the configuration information on resources in the scope of management operations in the storage system the administrator wishes to perform (or it is supposed that the administrator wishes to perform) is acquired as a priority from the storage apparatuses 200.

In the embodiment, to acquire the configuration information on resources in the scope of the management operations the administrator wishes to perform as a priority from the storage apparatuses 200, when the administrator performs an operation, the operation is instantly detected and the configuration information acquisition process under execution is terminated and quickly switched to the process for acquiring the configuration information on the resources in the scope of the management operations the administrator wishes to perform. To realize this, the process for acquiring configuration information on resource is finely divided into steps, and between the steps, it is ascertained whether there is an input operation from the administrator, and it is successively determined whether to continue the acquisition process under execution or terminate the acquisition process under execution and switch to another acquisition process for acquiring the configuration information the administrator wishes as a priority. In addition, the storage apparatuses 200 return search results by one record, for example, so that the acquisition process to be performed by the storage management server 300 can be finely divided into steps.

The configuration information acquisition process is performed by the controller 310 executing the configuration information acquisition program 334.

The configuration information acquisition program 334 reads the sets of screen identifiers and resource identifiers corresponding to the node selected by the user, which are stored in the main memory 330 by the GUI input/output program 331, and copies the read screen identifiers to variable op, and copies the resource identifiers to variable id (step S61). The variable op here is a variable to manage the screen identifier indicative of the screen operated by the administrator, and the variable id is a variable for managing the resource identifier noticed by the administrator (or supposed to be noticed by the administrator). When there is no screen operated by the administrator, the variable op and the variable id are set to "no screen".

Then, the configuration information acquisition program 334 judges whether the user is operating an arbitrary screen to determine whether it is necessary to acquire configuration information on a certain specific resource as a priority (step S62). In the embodiment, when the variable op is set to "no screen", there is no screen operated by the administrator and thus the configuration information acquisition program 334 determines that there is no need to acquire any configuration information as a priority. Meanwhile, when the variable op is not set to "no screen", there exists a screen operated by the administrator, and thus the configuration information acquisition program 334 determines that it is necessary to acquire some configuration information as a priority.

As a result, when determining that there is no need to acquire the configuration information on a certain specific resource as a priority (step S62: No), the configuration information acquisition program 334 invokes a transverse acquisition program 335 to perform a transverse acquisition process (refer to FIG. 16B) in a preset recommended acquisition order (step S63). Upon completion of the transverse acquisition process, the configuration information acquisition program 334 moves the process to step S65. When any screen operation by the administrator is detected during the transverse acquisition process, the configuration information acquisition program 334 terminates quickly the transverse acquisition process and moves the process to step S65.

Meanwhile, when determining that there is the need to acquire the configuration information on a certain specific resource as a priority (step S62: Yes), the configuration information acquisition program 334 invokes the longitudinal acquisition program 337 to execute a longitudinal acquisition process (refer to FIG. 17A) for searching the configuration information on the resource required by the administrator as a priority (step S64). Upon completion of the longitudinal acquisition process, the configuration information acquisition program 334 moves the process to step S65. When any screen operation by the administrator is detected during the longitudinal acquisition process, the configuration information acquisition program 334 quickly terminates the longitudinal acquisition process and moves the process to step S65.

At step S65, the configuration information acquisition program 334 investigates whether, out of the information groups in the configuration management information 341, the values of the field for final update time in all of the information records with the field for last update time are the same as the variable time, thereby to determine whether all of the updates of the configuration management information 341 are completed. When the last update times in all of the records are the same, the contents of all of the records are the latest ones, and thus the configuration information acquisition program 334 determines that all of the updates are completed (step S65: Yes), and terminates the configuration information acquisition process. Meanwhile, when the last update times in all of the records are not the same, the configuration information acquisition program 334 determines that not all of the updates are completed (step S65: No), and moves the process to step S62 to acquire the configuration information on the non-updated resources.

FIG. 16B is a flowchart of a transverse acquisition process according to the embodiment.

The transverse acquisition process is performed at step S63 of the configuration information acquisition process (FIG. 16A). The transverse acquisition process is performed by the controller 310 executing the transverse acquisition program 335. By the transverse acquisition process, the configuration information acquisition method illustrated in FIG. 3 is realized.

The transverse acquisition program 335 determines whether the storage system includes any virtual storage apparatus (step S71). In the embodiment, the transverse acquisition program 335 determines whether the virtual storage identifier 351*a* in the virtual storage information 351 has all the mark "–" indicative of invalid value. When the virtual storage identifier 351*a* in the virtual storage information 351 has all the mark "–" indicative of invalid value, the integral virtualization function is not used in the storage system. Thus, the transverse acquisition program 335 determines that the storage system does not include a virtual storage apparatus. In other cases, the transverse acquisition program 335 determines that the storage system includes some virtual storage apparatus.

As a result, when the storage system does not include any virtual storage apparatus (step S71: No), the transverse acquisition program 335 skips the step for acquiring the configuration information on virtual resources due to the absence of virtual resources, and moves the process to step S78.

Meanwhile, when the storage system includes any virtual storage apparatus (step S71: Yes), the transverse acquisition program 335 generates a search request for acquiring configuration information on the end virtual volumes (resources in the layer L1 illustrated in FIG. 2) to perform a search issue process (refer to FIG. 17B) (step S72). In the foregoing search request, the target storage apparatus groups are consolidated such that the virtual storage identifiers in the virtual storage identifier 351*a* of the virtual storage information 351 are unique without overlapping, the search starting point is "virtual volume information", the search method is "single search", and the search condition is "volume characteristic=end". Since the target storage groups are set with the virtual storage identifiers of all the virtual storage apparatuses, it is possible to acquire configuration information on the end virtual volumes related to a plurality of virtual storage apparatuses, that is, transversely acquire configuration information on the end virtual volumes.

Then, the transverse acquisition program 335 determines whether the values of the sets of variable op and variable id are the same as the values of the sets of the screen identifiers and the resource identifiers corresponding to the node selected by the administrator of the main memory 330. When the values are not the same, the transverse acquisition program 335 determines that the administrator has switched screens (step S73: Yes), and terminates the transverse acquisition process. On the other hand, when the values are not the same, the transverse acquisition program 335 determines that the administrator has not switched screens (step S73: No), and moves the process to the next step.

Then, the transverse acquisition program 335 generates a search request for acquiring configuration information on the virtual pool volumes (and internal virtual volumes) (resources in the layer L2 illustrated in FIG. 2) to perform a search issue process (refer to FIG. 17B) (step S74). In foregoing the search request for acquiring the configuration information on the virtual pool volumes, the target storage apparatus groups are consolidated such that the virtual storage identifiers in the virtual storage identifier 351*a* of the virtual storage information 351 are unique without overlapping, the search starting point is "virtual volume information", the search method is "single search", and the search condition is "none". In the foregoing search request for acquiring the configuration information on the internal virtual volumes, the target storage apparatus groups are consolidated such that the virtual storage identifiers in the virtual storage identifier 351*a* of the virtual storage information 351 are unique without overlapping, the search starting point is "virtual volume information", the search method is "single search", and the search condition is "volume characteristic=internal".

Then, the transverse acquisition program 335 determines whether the values of the sets of variable op and variable id are the same as the values of the sets of the screen identifiers and the resource identifiers corresponding to the node selected by the administrator of the main memory 330. When the values are not the same, the transverse acquisition program 335 determines that the administrator has switched screens (step S75: Yes), and terminates the transverse acquisition process. On the other hand, when the values are not the same, the transverse acquisition program 335 determines that the administrator has not switched screens (step S75: No), and moves the process to the next step.

Then, the transverse acquisition program 335 generates a search request for acquiring configuration information on the virtual parity groups (resources in the layer L3 illustrated in FIG. 2) to perform a search issue process (refer to FIG. 17B) (step S76). In the foregoing search request, the target storage apparatus groups are consolidated such that the virtual storage identifiers in the virtual storage identifier 351*a* of the virtual storage information 351 are unique without overlapping, the search starting point is "virtual parity group information", the search method is "single search", and the search condition is "none".

Then, the transverse acquisition program 335 determines whether the values of the sets of variable op and variable id are the same as the values of the sets of the screen identifiers and the resource identifiers corresponding to the node selected by the administrator of the main memory 330. When the values are not the same, the transverse acquisition program 335 determines that the administrator has switched screens (step S77: Yes), and terminates the transverse acquisition process. On the other hand, when the values are not the same, the transverse acquisition program 335 determines that the administrator has not switched screens (step S77: No), and moves the process to step S78.

Figure 17B:
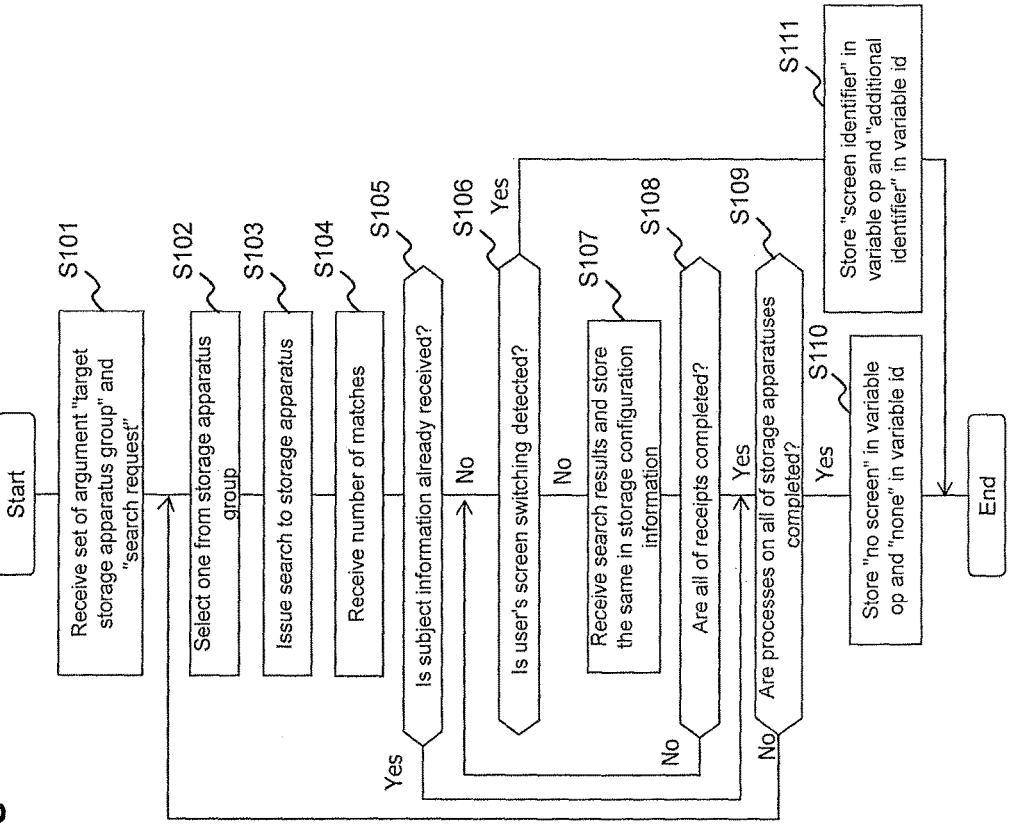
FIG. 17B is a flowchart of a search issue process according to the embodiment.

At step S78, the transverse acquisition program 335 generates a search request for acquiring configuration information on the end physical volumes (resources in the layer L4 illustrated in FIG. 2) to perform a search issue process (refer to FIG. 17B). In the foregoing search request, the target storage apparatus groups are consolidated such that the physical storage identifiers in the physical storage identifier 351b of the virtual storage information 351 are unique without overlapping, the search starting point is "physical volume information", the search method is "single search", and the search condition is "volume characteristic=end".

Then, the transverse acquisition program 335 determines whether the values of the sets of variable op and variable id are the same as the values of the sets of the screen identifiers and the resource identifiers corresponding to the node selected by the administrator of the main memory 330. When the values are not the same, the transverse acquisition program 335 determines that the administrator has switched screens (step S79: Yes), and terminates the transverse acquisition process. On the other hand, when the values are not the same, the transverse acquisition program 335 determines that the administrator has not switched screens (step S79: No), and moves the process to the next step.

Then, the transverse acquisition program 335 generates a search request for acquiring configuration information on the physical pool volumes (and internal physical volumes) (resources in the layer L5 illustrated in FIG. 2) to perform a search issue process (refer to FIG. 17B) (step S80). In foregoing the search request for acquiring the configuration information on the physical pool volumes, the target storage apparatus groups are consolidated such that the physical storage identifiers in the physical storage identifier 351b of the virtual storage information 351 are unique without overlapping, the search starting point is "physical pool information", the search method is "single search", and the search condition is "none". In the foregoing search request for acquiring the configuration information on the internal physical volumes, the target storage apparatus groups are consolidated such that the physical storage identifiers in the physical storage identifier 351b of the virtual storage information 351 are unique without overlapping, the search starting point is "physical volume information", the search method is "single search", and the search condition is "volume characteristic=internal".

Then, the transverse acquisition program 335 determines whether the values of the sets of variable op and variable id are the same as the values of the sets of the screen identifiers and the resource identifiers corresponding to the node selected by the administrator of the main memory 330. When the values are not the same, the transverse acquisition program 335 determines that the administrator has switched screens (step S81: Yes), and terminates the transverse acquisition process. On the other hand, when the values are not the same, the transverse acquisition program 335 determines that the administrator has not switched screens (step S81: No), and moves the process to the next step.

Then, the transverse acquisition program 335 generates a search request for acquiring configuration information on the physical parity groups (resources in the layer L6 illustrated in FIG. 2) to perform a search issue process (refer to FIG. 17B) (step S82). In the foregoing search request, the target storage apparatus groups are consolidated such that the physical storage identifiers in the physical storage identifier 351b of the virtual storage information 351 are unique without overlapping, the search starting point is "physical parity group information", the search method is "single search", and the search condition is "none".

After that, the transverse acquisition program 335 terminates the transverse acquisition process.

According to the transverse acquisition process, it is possible to acquire the configuration information on the virtual resources with a higher priority than the configuration information on the physical resources.

In the search issue process, screen switching by the administrator is detected. Upon detection of screen switching, the search issue process is immediately terminated. Thus, when the search issue process is terminated due to screen switching by the administrator, it is also possible to terminate immediately the transverse acquisition process. In addition, in the transverse acquisition process, the search issue process is performed by pre-decided unit (by resource in each of the layers in the example of FIG. 16B), and when screen switching by the administrator is detected during the search issue process, the transverse acquisition process is immediately terminated. Accordingly, it is possible to acquire the configuration information on the resources desired by the administrator as a priority in quick response to screen switching by the administrator.

Figure 17A:
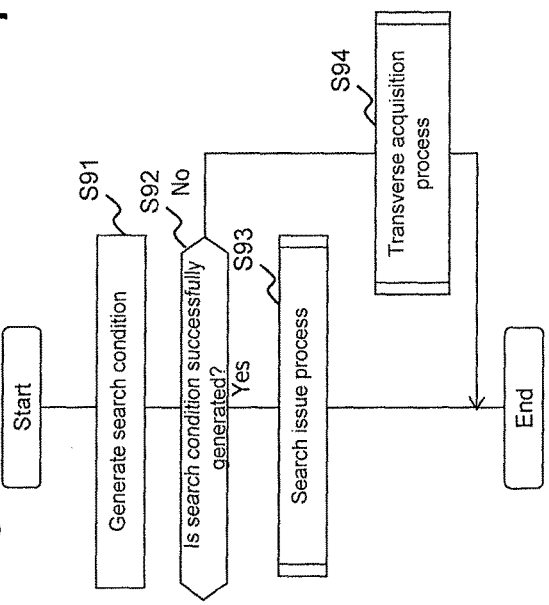
FIG. 17A is a flowchart of a longitudinal acquisition process according to the embodiment.

FIG. 17A is a flowchart of a longitudinal acquisition process according to the embodiment.

The longitudinal acquisition process is performed at step S64 of the configuration information acquisition process (refer to FIG. 16A). The longitudinal acquisition process is performed by the controller 310 executing the longitudinal acquisition program 337. According to the longitudinal acquisition process, the configuration information acquisition method illustrated in FIG. 4 or 5 is realized.

The longitudinal acquisition program 337 generates a search condition for acquiring the configuration information on resources needed for management operations by the administrator on the screen under operation (step S91).

Specifically, the longitudinal acquisition program 337 searches the screen table 338 to acquire records in which there is a match between the screen identifiers in the screen identifier 338a and the values of the variable op.

When there is no record in which there is a match between the screen identifier in the screen identifier 338a and the value of the variable op, the longitudinal acquisition program 337 determines that there is no optimum acquisition method for acquiring the configuration information on the required resources corresponding to the screen under operation by the administrator and the generation of the search request is failed. On the other hand, when there is a record in which there is a match between the screen identifier in the screen identifier 338a and the value of the variable op and the record is acquired, the longitudinal acquisition program 337 determines whether the value of the management server information name 338e in the acquired record (referred to as acquisition screen table record) is the invalid value "−". When the value of the management server information name 338e in the acquisition screen table record is the invalid value "−", the longitudinal acquisition program 337 generates a search condition without using the management server information 342. In this case, the configuration information acquisition method as illustrated in FIG. 4 is realized. In this case, the longitudinal acquisition program 337 uses the value described in the search condition 338c of the acquisition screen table record as search condition in the search request. However, when the character string "variable id" is included in the value of the search condition 338c, the longitudinal acquisition program 337 substitutes the "variable id" in the value with an actual value of variable id, and sets the substituted value as search condition.

On the other hand, when the value of the management server information name 338e in the acquisition screen table record is not the invalid value "–", the longitudinal acquisition program 337 generates a search condition using the management server information 342. In this case, the configuration information acquisition method as illustrated in FIG. 5 is realized. In this case, the longitudinal acquisition program 337 refers to and searches the table (for example, the volume reservation table 343) corresponding to the table name in the management server information 342 described in the management server information name 338e to acquire a record in which there is a match between the value of the column (field) corresponding to the resource identifier name in the resource identifier 338b and the value of the variable id to solve "?" in the value of the search condition 338c in the acquisition screen table record. Then, the longitudinal acquisition program 337 substitutes the value "?" in the search condition 338c of the acquisition screen table record with the value of the record acquired from the management server information 342, and sets the substituted value as search condition.

For example, when the variable op="host/reserved volume" and the variable id="host 3", the longitudinal acquisition program 337 acquires the record in the bottom of the screen table 338. Next, the longitudinal acquisition program 337 refers to the table (volume reservation table 343) corresponding to the "volume reservation table" stored in the management server information name 338e of the acquired record (acquisition screen table record) to search the records in which the value of the column corresponding to the "host identifier" in the resource identifier 338b of the acquisition screen table record is "host 3". Accordingly, it is possible to obtain from the volume reservation table 343 the records in which the virtual volume identifier 343b is "virtual volume identifier 7" or "virtual volume identifier 8". Then, the longitudinal acquisition program 337 substitutes the "?" of the search condition 338c in the acquisition screen table record with the content of the records acquired from the volume reservation table 343, thereby to set as search condition "virtual volume identifier"="virtual volume identifier 7 or 8". Accordingly, it is possible to appropriately narrow down the range of resources on which configuration information is to be acquired using the management server information 342.

The longitudinal acquisition program 337 determines whether the search condition is successfully generated at step S91 (step S92). As a result, when the search condition is successfully generated (step S92: Yes), the longitudinal acquisition program 337 moves the process to step S93. On the other hand, when there is no record with a match in the screen table 338 and thus the search condition is not successfully generated (step S92: No), the longitudinal acquisition program 337 moves the process to step S94.

At step S93, the longitudinal acquisition program 337 generates a search request to perform the search issue process (refer to FIG. 17B) (step S93). When the resource identifier 338b in the acquisition screen table record is "virtual storage identifier" or "physical storage identifier", the longitudinal acquisition program 337 sets the storage apparatus group targeted by the search request to only the storage apparatus 200 set in the variable id. On the other hand, when the resource identifier 338b in the acquisition screen table record is "host identifier", the longitudinal acquisition program 337 cannot specify the target storages, and thus targets all of the virtual storage apparatuses, and consolidates the target storage apparatus groups such that the virtual storage identifiers in the virtual storage identifier 351a of the virtual storage information 351 are unique without overlapping. In addition, the longitudinal acquisition program 337 sets the search starting point in the search request as value of the search starting point 338d in the acquisition screen table record, the search condition as the search condition generated at step S91, and the search method as "relevance tracking".

At step S94, the longitudinal acquisition program 337 invokes the transverse acquisition program 335 to perform the transverse acquisition process (refer to FIG. 16B) for searching for the configuration information on the resources in a preset recommended acquisition order, thereby to terminate the longitudinal acquisition process.

FIG. 17B is a flowchart of a search issue process according to the embodiment.

The search issue process is invoked and performed at steps S72, S74, S76, S78, S80, and S82 of the transverse acquisition process and at step S93 of the longitudinal acquisition process. The search issue process is performed by the controller 310 executing the search issue program 336.

The search issue process is performed by the search issue program 336 to issue a search request for acquiring in sequence configuration information on resources in an arbitrarily narrowed range through the communication network 20 to the storage apparatus 200 groups, receive only the search results matching the search request, and store the information of the search results in the configuration management information 341 of the corresponding storage management server 300. In the embodiment, at each receipt of one search result, the search issue program 336 checks for a screen operation performed by the administrator, and when any screen operation has been performed, the search issue program 336 stops the search issue process. Therefore, when any screen operation has been performed by the administrator, it is possible to quickly stop the search issue process.

The search issue program 336 receives a set of a target storage apparatus group and the search request as arguments, from the process of the search issue process invoker (step S101). The target storage apparatus group here is an array of storage identifiers of one or more storage apparatuses (physical storage apparatuses or virtual storage apparatuses) as a target of search issue. The search request includes a search method, a search starting point, and a search condition required for search request to the storage apparatuses 200.

Next, the search issue program 336 selects one unprocessed storage apparatus from the target storage apparatus group (step S102). When the identifier of the storage apparatus in the target storage apparatus group is a virtual storage identifier, the search issue program 336 uses the virtual storage information 351 to acquire the physical storage identifier of the physical storage apparatus 200 corresponding to the virtual storage identifier.

Then, the search issue program 336 issues the search request received as argument to the storage apparatus 200 with the physical storage identifier corresponding to the selected storage apparatus (step S103). At that time, the search issue program 336 adds a refinement condition for the currently selected storage apparatus to the search condition in the search request. For example, when the currently selected storage apparatus is a virtual storage apparatus, the search issue program 336 sets the search condition to "virtual storage identifier=the currently selected virtual storage identifier and the search condition received as argument", and when the selected storage apparatus is a physical storage apparatus 200, the search issue program 336 sets the search condition to "physical storage identifier=the currently selected physical storage apparatus and the search condition received as argument". Accordingly, step S12 and the following steps in the configuration information search process (refer to FIG. 13) are started at the storage apparatus 200 having received the search request, and then the number of items matching the search condition in the search request is returned.

Then, the search issue program 336 receives the number of items matching the search condition (number of matches) from the storage apparatus 200 (step S104). The search issue program 336 returns a notification of receipt of the number of matches to the storage apparatus 200.

Then, the search issue program 336 determines whether the configuration information corresponding to the search request is already received (step S105). Specifically, the search issue program 336 searches the table in the configuration management information 341 as a save destination of information received as search results corresponding to the search request, to count the number of records matching the search request issued to the storage apparatus 200 and having the last update time matching the value of the variable time. When there is a match between the counting result and the number of matches received at step S104, the search issue program 336 determines that the configuration information corresponding to the search request is already received. On the other hand, when there is no match between the counting results and the number of matches received at step S104, the search issue program 336 determines that the configuration information corresponding to the research request is not yet received.

As a result, when the configuration information corresponding to the search request is already received (step S105: Yes), the search issue program 336 skips the process for receiving the search results from the storage apparatus to which the search request has been issued, and moves the process to step S109. On the other hand, when the configuration information corresponding to the research request is not yet received (step S105: No), the search issue program 336 moves the process to step S106.

At step S106, the search issue program 336 determines whether screen switching by the administrator is detected. Specifically, the search issue program 336 reads by the GUI input/output program 331 the set of screen identifier and resource identifier stored in the main memory 330. When there is a match between the value of the set and the value of the set of variable op and variable id, the search issue program 336 determines that the administrator has not switched screens. On the other hand, when there is no match, the search issue program 336 determines that the administrator has switched screens.

As a result, when determining that the administrator has switched screens (step S106: Yes), the search issue program 336 stores the acquired screen identifier in the variable op, stores the resource identifier in the variable id (step 111), and terminates immediately the search issue process.

On the other hand, when determining that the administrator has not switched screens (step S106: No), the search issue program 336 receives a predetermined number of search result (for example, one result) transmitted from the storage apparatus 200, and stores the configuration information in the received search result in corresponding information of the configuration management information 341 (step S107). Specifically, the search issue program 336 adds a record to information (table) with the same name as the received information. When any record with the same identifier is already registered in the table, the search issue program 336 overwrites the record with the received information. The search issue program 336 also stores the value of the variable time in the field for last update time of the record. The search issue program 336 returns a reply notifying receipt of the predetermined number of search result to the storage apparatus 200.

Then, the search issue program 336 determines whether all of the search results are received depending on whether the records of the received number of matches are processed (step S108). As a result, when the records of the received number of matches are not processed (step S108: No), the search issue program 336 moves the process to step S106. On the other hand, when the records of the received number of matches are processed (step S108: Yes), the search issue program 336 moves the process to step S109.

At step S109, the search issue program 336 determines whether all of the storage apparatuses in the target storage apparatus group received as argument are completely processed. As a result, when all of the storage apparatuses are not completely processed (step S109: No), the search issue program 336 moves the process to step S102 to process the unprocessed storage apparatus(es). Meanwhile, when all of the storage apparatuses are completely processed (step S109: Yes), the search issue program 336 moves the process to step S110.

At step S110, all of the prioritized configuration information is completely acquired without interruption, and thus the search issue program 336 stores "no screen" in the variable op and "none" in the variable id to initialize the variable op and the variable id, and then terminates the search issue process.

As in the foregoing, the embodiment is described. As a matter of the course, however, the present invention is not limited to the foregoing embodiment but can be modified in various manners without deviating from the gist of the present invention.

For example, in the foregoing embodiment, the monitor 370 and the input apparatus 380 coupled to the storage management server 300 are used to provide information to the administrator and accept input operations from the administrator. However, the present invention is not limited to this but, for example, terminals coupled via the communication network 20 may be used to provide information to the administrator and accept input operations from the administrator.

REFERENCE SIGNS LIST

100 . . . Host computer, 200 . . . Storage apparatus, 300 . . . Storage management server

The invention claimed is:

1. A configuration information acquisition method, comprising:
  receiving a request from a host computer;
  acquiring, from one or more storage apparatuses, configuration information about one or more resource from a plurality of resources, based on the request;
  determining a priority for the request based on whether a user is operating an arbitrary screen of the host computer;
  on a condition the request is determined to be a priority, performing a longitudinal acquisition process to receive the configuration information corresponding to the request from the one or more storage apparatuses;

on a condition the request is not determined to be a priority, performing a transverse acquisition process to receive the configuration information corresponding to the request from the one or more storage apparatuses; and incorporating the received configuration information into configuration management information for managing configuration information on resources managed by the one or more storage apparatuses;

wherein the transverse process includes:
determining if the request includes a virtual resource, detecting if the host computer has switched screens, and
determining a parity group for virtual resource; and wherein the longitudinal process includes:
selecting a particular storage group from a plurality of storage groups based on the request,
issuing a search of the particular storage group, and
detecting if the host computer has switched screens.

2. The configuration information acquisition method according to claim 1, further comprising:
outputting resource information relevant to one or more resources onto a display apparatus based on the configuration management information.

3. The configuration information acquisition method according to claim 1, further comprising:
backing up the management information in at least one of the one or more storage apparatuses.

4. A management computer comprising:
a storage device that stores configuration management information for a plurality of resources managed by one or more storage apparatuses;
a network interface communicatively coupled to the one or more storage apparatuses; and
a processor communicatively coupled to the storage device and the network interface;
and
wherein the processor:
receives, using the network interface, a request from the one or more storage apparatuses to acquire configuration information about one or more resources from the plurality of resources;
determines a priority for the request based on whether a user is operating an arbitrary screen of a host computer;
on a condition the request is determined to be a priority, performing a longitudinal acquisition process to receive the configuration information on the resources corresponding to requests for the configuration information from the one or more storage apparatuses;
on a condition the request is not determined to be a priority, performing a transverse acquisition process to receive the configuration information on the resources corresponding to requests for the configuration information from the one or more storage apparatuses, and
incorporate the received configuration information into the configuration management information;
wherein the transverse process includes:
determining if the request includes a virtual resource, detecting if the host computer has switched screens, and
determining a parity group for virtual resource; and
wherein the longitudinal process includes:
selecting a particular storage group from a plurality of storage groups based on the request,
issuing a search of the particular storage group, and
detecting if the host computer has switched screens.

5. The management computer according to claim 4, further comprising a display apparatus communicatively coupled to the processor;
wherein the processor further:
outputs resource information relevant to one or more resources onto the display apparatus based on the configuration management information.

* * * * *